(12) United States Patent
Cohen et al.

(10) Patent No.: US 9,152,928 B2
(45) Date of Patent: Oct. 6, 2015

(54) CONTEXT PARAMETERS AND IDENTIFIERS FOR COMMUNICATION

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US); Clarence T. Tegreene, Bellevue, WA (US)

(73) Assignee: Triplay, Inc., New York, NY (US)

( * ) Notice: Subject to any disclaimer, the term of this patent is extended or adjusted under 35 U.S.C. 154(b) by 390 days.

(21) Appl. No.: 11/645,219

(22) Filed: Dec. 21, 2006

(65) Prior Publication Data

US 2008/0005681 A1    Jan. 3, 2008

Related U.S. Application Data

(63) Continuation-in-part of application No. 11/506,415, filed on Aug. 18, 2006, now Pat. No. 8,346,872, which is a continuation-in-part of application No. 11/480,773, filed on Jun. 30, 2006, now abandoned.

(51) Int. Cl.
*G06F 15/16*    (2006.01)
*G06Q 10/00*    (2012.01)

(52) U.S. Cl.
CPC ...................................... *G06Q 10/00* (2013.01)

(58) Field of Classification Search
CPC ....................... G06Q 10/1095; G06Q 20/4014

USPC .................................................. 709/206, 227
See application file for complete search history.

(56) References Cited

U.S. PATENT DOCUMENTS

| | | |
|---|---|---|
| 5,473,367 A | 12/1995 | Bales et al. |
| 6,018,668 A | 1/2000 | Schmidt |
| 6,064,671 A | 5/2000 | Killian |
| 6,185,184 B1 | 2/2001 | Mattaway et al. |
| 6,192,396 B1 * | 2/2001 | Kohler ........................ 709/206 |
| 6,240,414 B1 | 5/2001 | Beizer et al. |
| 6,310,946 B1 | 10/2001 | Bauer et al. |
| 6,335,963 B1 * | 1/2002 | Bosco ........................ 379/88.12 |
| 6,356,936 B1 | 3/2002 | Donoho et al. |
| 6,658,568 B1 | 12/2003 | Ginter et al. |
| 6,678,719 B1 | 1/2004 | Stimmel |
| 6,731,308 B1 | 5/2004 | Tang et al. |
| 6,896,263 B2 | 5/2005 | Matthews |
| 6,912,564 B1 * | 6/2005 | Appelman et al. ........... 709/204 |
| 6,996,217 B2 * | 2/2006 | Goldman .................. 379/142.01 |
| 6,999,962 B2 | 2/2006 | Julliard et al. |
| 7,039,597 B1 | 5/2006 | Notani et al. |
| 7,143,175 B2 | 11/2006 | Adams et al. |
| 7,149,296 B2 * | 12/2006 | Brown et al. ................. 379/145 |
| 7,299,257 B2 | 11/2007 | Boyer et al. |
| 7,305,398 B2 | 12/2007 | Teicher |
| 7,383,307 B2 * | 6/2008 | Kirkland et al. ............. 709/206 |
| 7,533,146 B1 | 5/2009 | Kumar |

(Continued)

FOREIGN PATENT DOCUMENTS

EP    1 523 166 A1    4/2005

*Primary Examiner* — Phuoc Nguyen
(74) *Attorney, Agent, or Firm* — Greenberg Traurig, LLP

(57) ABSTRACT

In one aspect, a method related to communication. In addition, other method, system, and program product aspects are described in the claims, drawings, and/or text forming a part of the present application.

28 Claims, 13 Drawing Sheets

(56) References Cited

U.S. PATENT DOCUMENTS

| | | |
|---|---|---|
| 7,574,746 B2 | 8/2009 | Hill et al. |
| 7,624,188 B2 | 11/2009 | Koskelainen |
| 7,653,188 B2 * | 1/2010 | Kloberdans et al. .......... 379/145 |
| 7,707,262 B1 | 4/2010 | Bill |
| 7,797,732 B2 | 9/2010 | Tam et al. |
| 7,925,702 B2 | 4/2011 | Rood et al. |
| 7,933,985 B2 * | 4/2011 | Kurapati et al. .............. 709/224 |
| 7,945,034 B2 * | 5/2011 | Gonen et al. ............ 379/142.05 |
| 8,015,414 B2 * | 9/2011 | Mahone et al. ............... 713/189 |
| 8,040,875 B2 * | 10/2011 | Barclay et al. ................. 370/352 |
| 2002/0034164 A1 | 3/2002 | Sjoholm et al. |
| 2002/0044067 A1 * | 4/2002 | Ilcisin ...................... 340/825.49 |
| 2002/0049751 A1 | 4/2002 | Chen et al. |
| 2002/0076015 A1 | 6/2002 | Norwitz et al. |
| 2002/0098879 A1 | 7/2002 | Rheey |
| 2002/0183100 A1 | 12/2002 | Parker |
| 2003/0112949 A1 | 6/2003 | Brown et al. |
| 2003/0147519 A1 * | 8/2003 | Jain et al. .................. 379/211.02 |
| 2003/0182371 A1 | 9/2003 | Worthen |
| 2003/0236847 A1 * | 12/2003 | Benowitz et al. ............. 709/206 |
| 2004/0005904 A1 | 1/2004 | Wolf et al. |
| 2004/0019641 A1 | 1/2004 | Bartram et al. |
| 2004/0039829 A1 | 2/2004 | Bucher |
| 2004/0088286 A1 | 5/2004 | Hackleman et al. |
| 2004/0103147 A1 | 5/2004 | Flesher et al. |
| 2004/0117194 A9 | 6/2004 | Lee et al. |
| 2004/0254809 A1 | 12/2004 | Teicher |
| 2005/0086256 A1 | 4/2005 | Owens et al. |
| 2005/0089023 A1 | 4/2005 | Barkley et al. |
| 2005/0097169 A1 | 5/2005 | Mukherjee et al. |
| 2005/0108207 A1 | 5/2005 | Thuerk |
| 2005/0149620 A1 * | 7/2005 | Kirkland et al. .............. 709/207 |
| 2005/0160167 A1 | 7/2005 | Cheng et al. |
| 2005/0164720 A1 * | 7/2005 | Huang ........................... 455/466 |
| 2005/0181803 A1 | 8/2005 | Weaver et al. |
| 2005/0275715 A1 | 12/2005 | Shingu et al. |
| 2006/0004869 A1 | 1/2006 | Yuster et al. |
| 2006/0019689 A1 | 1/2006 | Pantalone et al. |
| 2006/0036727 A1 * | 2/2006 | Kurapati et al. ............... 709/224 |
| 2006/0067502 A1 | 3/2006 | Bamrah et al. |
| 2006/0140200 A1 | 6/2006 | Black et al. |
| 2006/0154661 A1 * | 7/2006 | Gonen et al. ................ 455/435.1 |
| 2006/0222155 A1 | 10/2006 | Summers et al. |
| 2006/0227754 A1 | 10/2006 | Ko |
| 2006/0242303 A1 | 10/2006 | Petrack |
| 2006/0246934 A1 | 11/2006 | Patel et al. |
| 2007/0021200 A1 * | 1/2007 | Fox et al. .......................... 463/30 |
| 2007/0036310 A1 | 2/2007 | Smith et al. |
| 2007/0042763 A1 * | 2/2007 | Yeh ................................ 455/418 |
| 2007/0081648 A1 * | 4/2007 | Abramson et al. ............. 379/161 |
| 2007/0121596 A1 * | 5/2007 | Kurapati et al. ............... 370/356 |
| 2007/0121614 A1 * | 5/2007 | Sandell et al. ................. 370/389 |
| 2007/0133774 A1 | 6/2007 | Fujimoto |
| 2007/0156811 A1 | 7/2007 | Jain et al. |
| 2007/0172047 A1 | 7/2007 | Coughlan et al. |
| 2007/0204033 A1 * | 8/2007 | Bookbinder et al. ......... 709/224 |
| 2007/0232285 A1 | 10/2007 | Lush et al. |
| 2007/0240081 A1 * | 10/2007 | Grossman et al. ............. 715/854 |
| 2007/0244807 A1 * | 10/2007 | Andringa et al. ................ 705/38 |
| 2007/0263819 A1 * | 11/2007 | Finkelman et al. ...... 379/201.11 |
| 2007/0263824 A1 | 11/2007 | Bangalore et al. |
| 2007/0264974 A1 * | 11/2007 | Frank et al. .................... 455/411 |
| 2007/0288755 A1 * | 12/2007 | Bryant .......................... 713/182 |
| 2008/0005229 A1 * | 1/2008 | Cohen et al. ................... 709/203 |
| 2008/0005236 A1 | 1/2008 | Schmieder |
| 2008/0005242 A1 * | 1/2008 | Cohen et al. ................... 709/204 |
| 2008/0005681 A1 * | 1/2008 | Cohen et al. ................... 715/762 |
| 2008/0089501 A1 * | 4/2008 | Benco et al. .............. 379/142.01 |
| 2008/0109860 A1 | 5/2008 | Glashow et al. |
| 2008/0307306 A1 * | 12/2008 | Pettinati et al. ............... 715/711 |
| 2009/0209241 A1 | 8/2009 | Karaoguz et al. |
| 2009/0316876 A1 * | 12/2009 | Walsh et al. ............. 379/210.02 |
| 2010/0322395 A1 * | 12/2010 | Michaelis et al. .......... 379/88.14 |
| 2011/0004939 A1 * | 1/2011 | Cohen et al. ..................... 726/26 |
| 2011/0004940 A1 * | 1/2011 | Cohen et al. ..................... 726/26 |
| 2011/0145570 A1 | 6/2011 | Gressel et al. |

\* cited by examiner

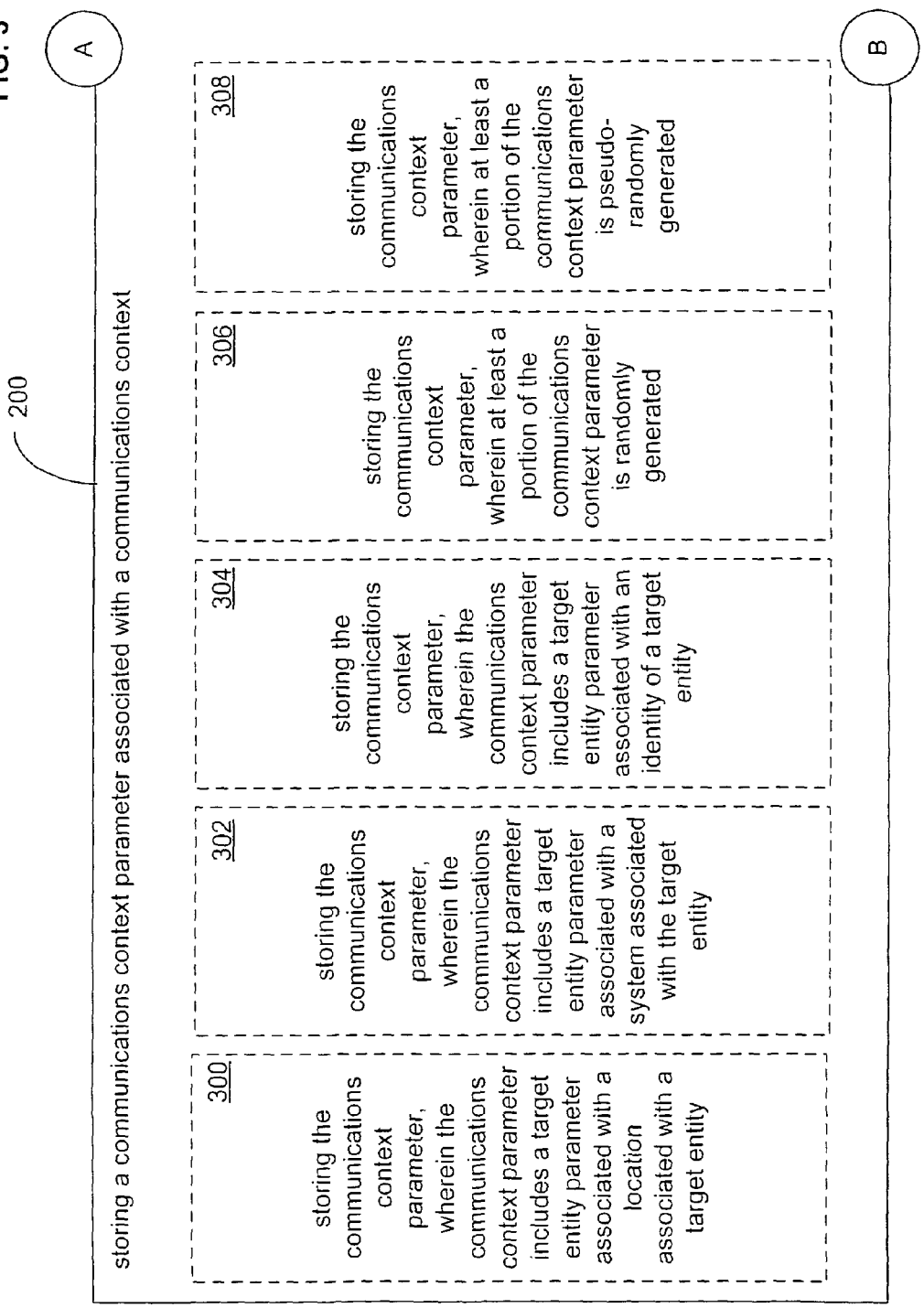

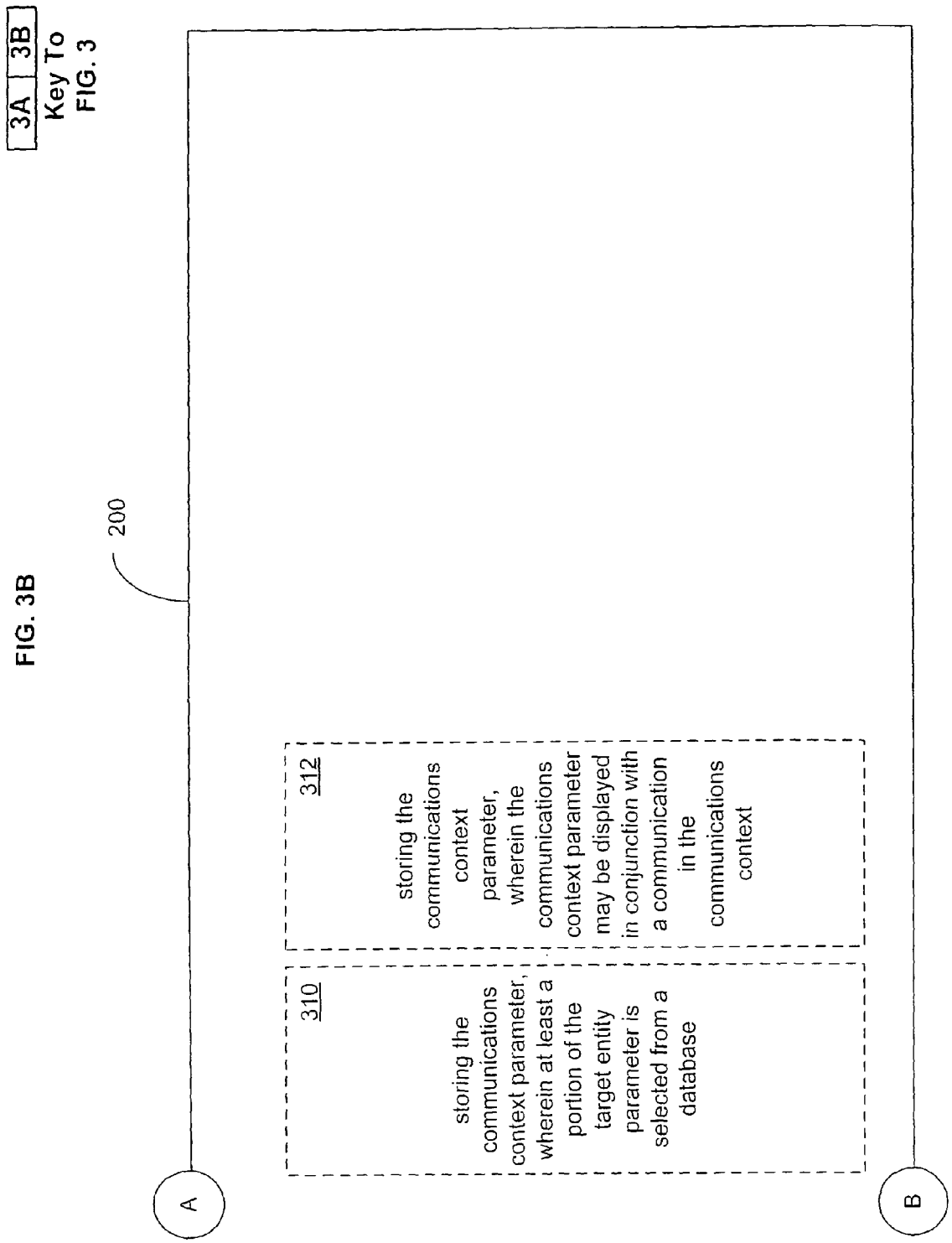

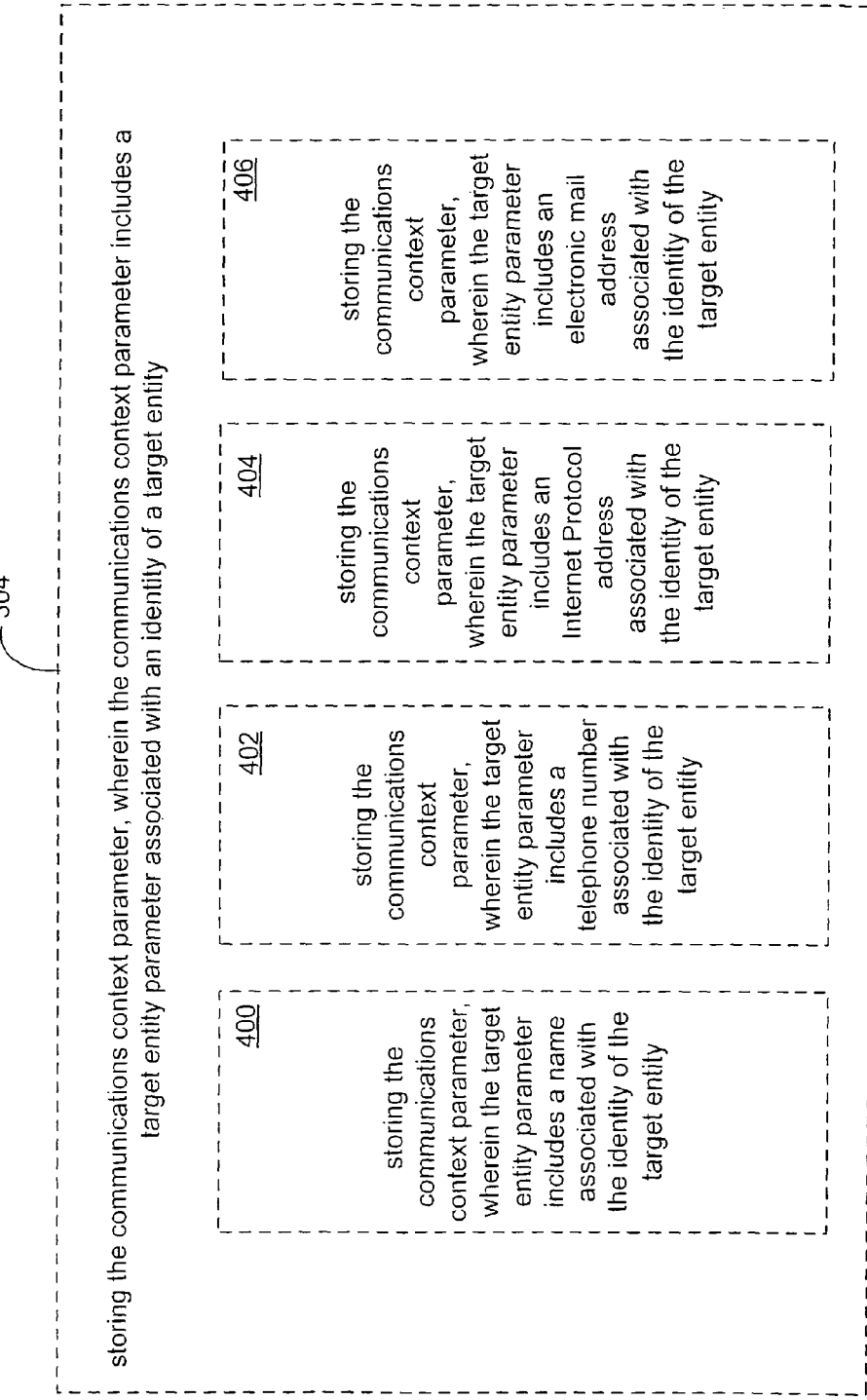

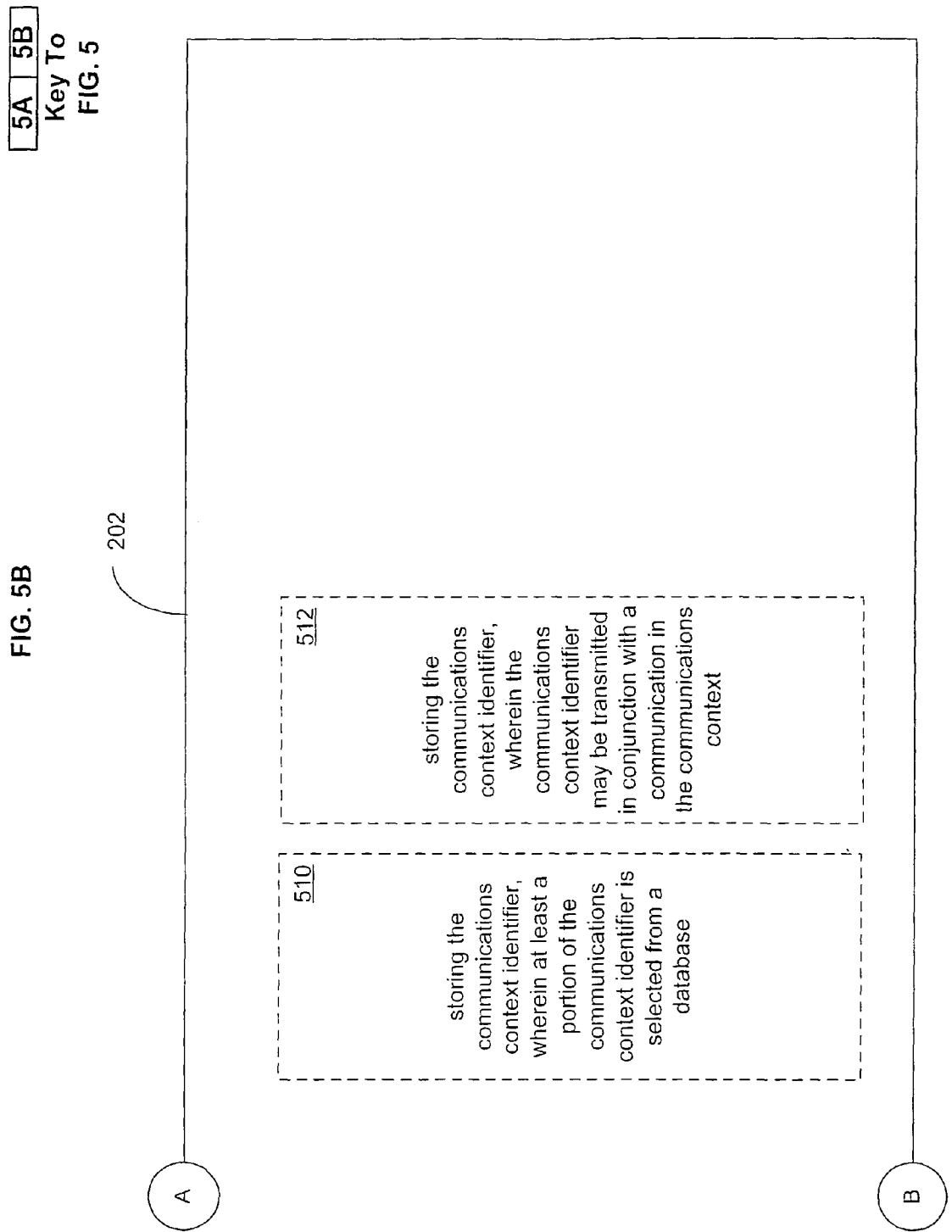

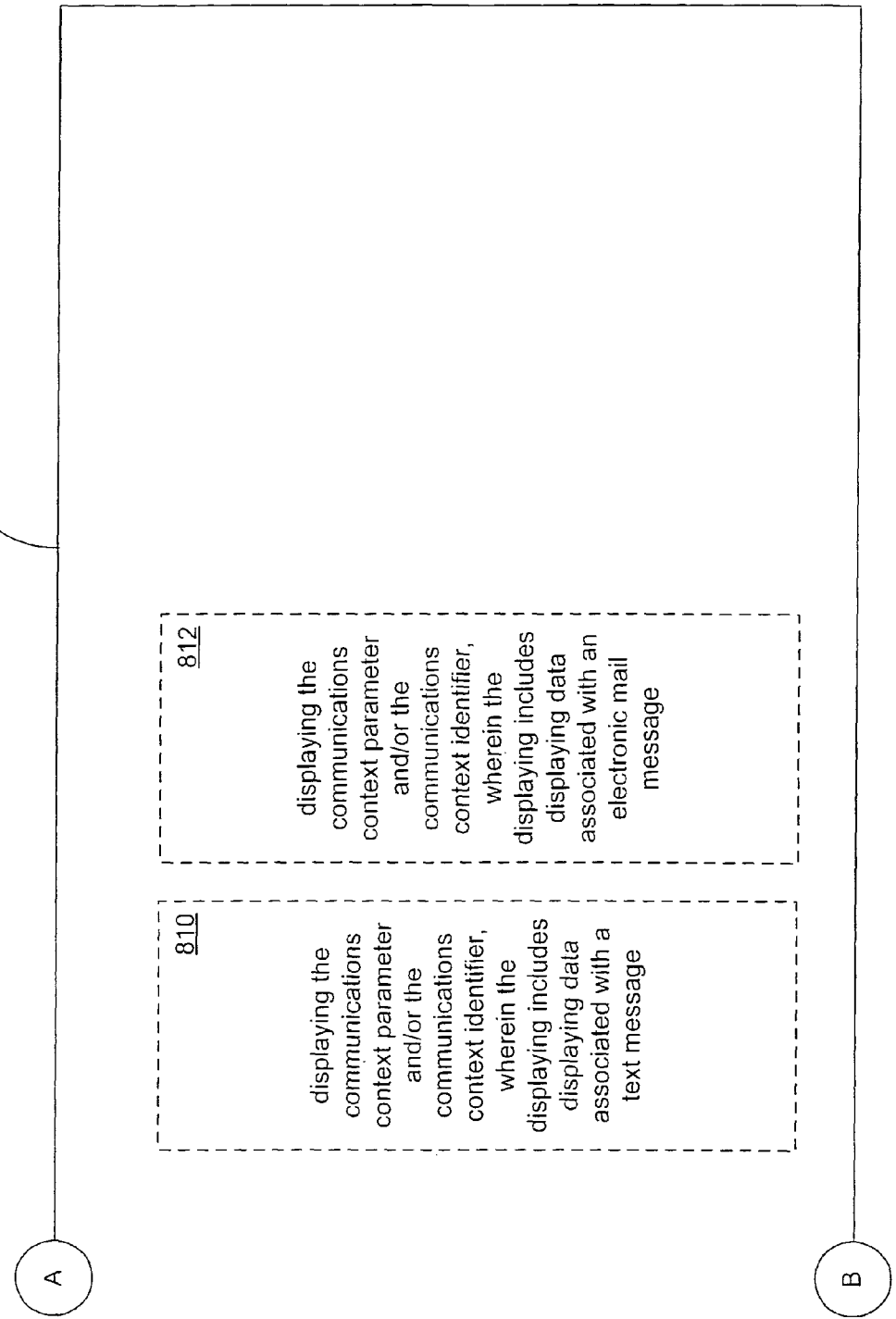

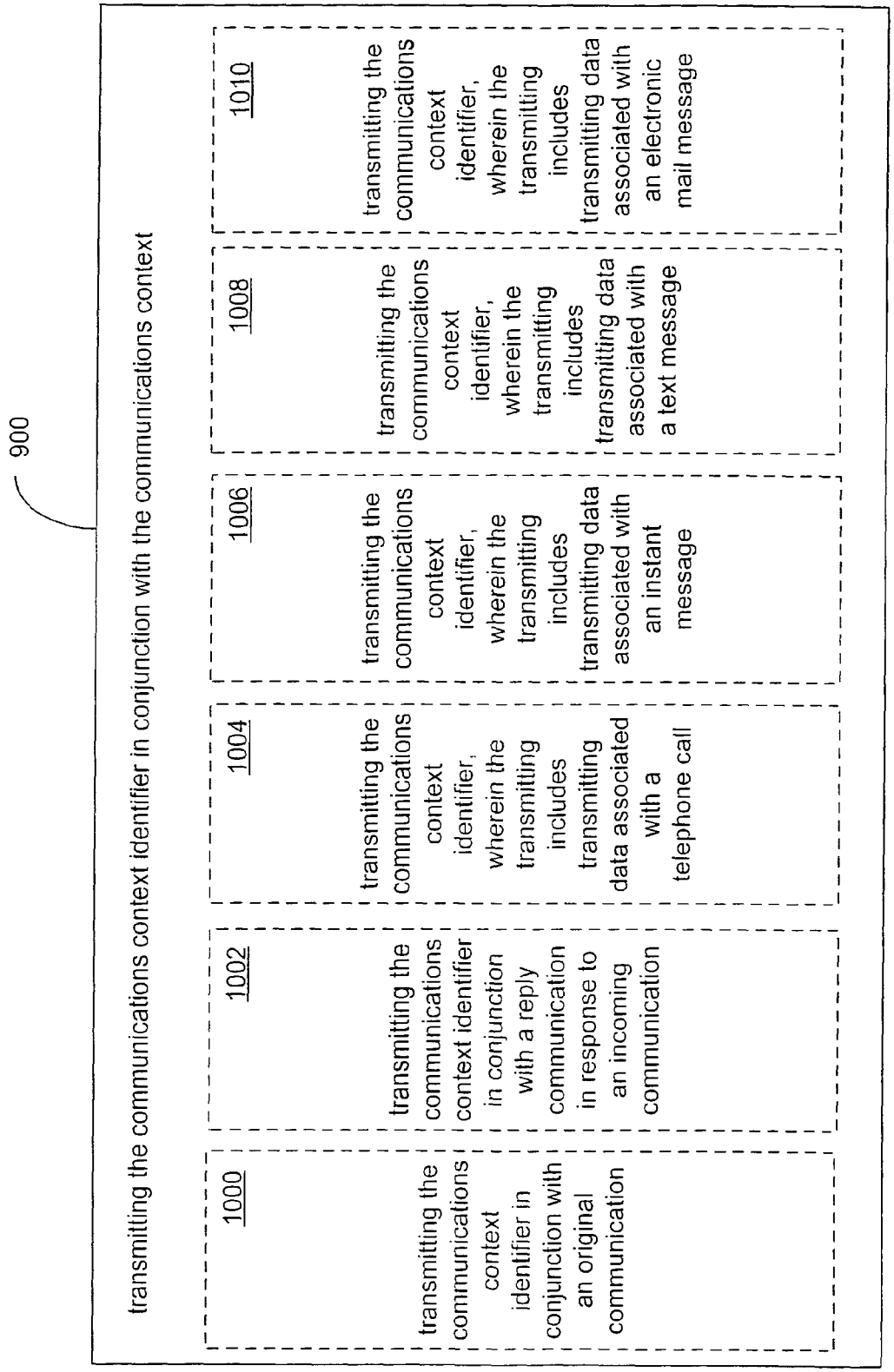

CONTEXT PARAMETERS AND IDENTIFIERS FOR COMMUNICATION

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATION

For purposes of the USPTO extra-statutory requirements, the present application constitutes a continuation-in-part of U.S. patent application Ser. No. 11/480,773, entitled Usage Parameters for Communication Content, naming Alexander J. Cohen, Edward K. Y. Jung, Royce A. Levien, Robert W. Lord, Mark A. Malamud, William Henry Mangione-Smith, John D. Rinaldo, Jr., and Clarence T. Tegreene, as inventors, filed 30 Jun. 2006, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/506,415, entitled CONTEXT PARAMETERS AND IDENTIFIERS FOR COMMUNICATION, naming Alexander J. Cohen; Edward K. Y. Jung; Royce A. Levien; Robert W. Lord; Mark A. Malamud; William Henry Mangione-Smith; John D. Rinaldo, Jr.; Clarence T. Tegreene; as inventors, filed 18 Aug. 2006, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present application relates, in general, to communication.

SUMMARY

In one aspect, a method related to communication includes but is not limited to storing a communications context parameter associated with a communications context; and storing a communications context identifier associated with the communications context. In addition to the foregoing, other method aspects are described in the claims, drawings, and text forming a part of the present application.

In one aspect, a system related to communication includes but is not limited to circuitry for storing a communications context parameter associated with a communications context; and circuitry for storing a communications context identifier associated with the communications context. In addition to the foregoing, other system aspects are described in the claims, drawings, and text forming a part of the present application.

In one or more various aspects, related systems include but are not limited to circuitry and/or programming and/or electro-mechanical devices and/or optical devices for effecting the herein-referenced method aspects; the circuitry and/or programming and/or electromechanical devices and/or optical devices can be virtually any combination of hardware, software, and/or firmware configured to effect the herein-referenced method aspects depending upon the design choices of the system designer skilled in the art.

In one aspect, a program product includes but is not limited to a signal bearing medium bearing one or more instructions for storing a communications context parameter associated with a communications context; and one or more instructions for storing a communications context identifier associated with the communications context. In addition to the foregoing, other program product aspects are described in the claims, drawings, and text forming a part of the present application.

In addition to the foregoing, various other method, system, and/or program product aspects are set forth and described in the teachings such as the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 3 depicts several alternative implementations of the high-level logic flowchart of FIG. 2;

FIG. 4 depicts several alternative implementations of the high-level logic flowchart of FIG. 3;

FIG. 10 depicts several alternative implementations of the high-level logic flowchart of FIG. 9.

The use of the same symbols in different drawings typically indicates similar or identical items.

DETAILED DESCRIPTION

Figure 1:
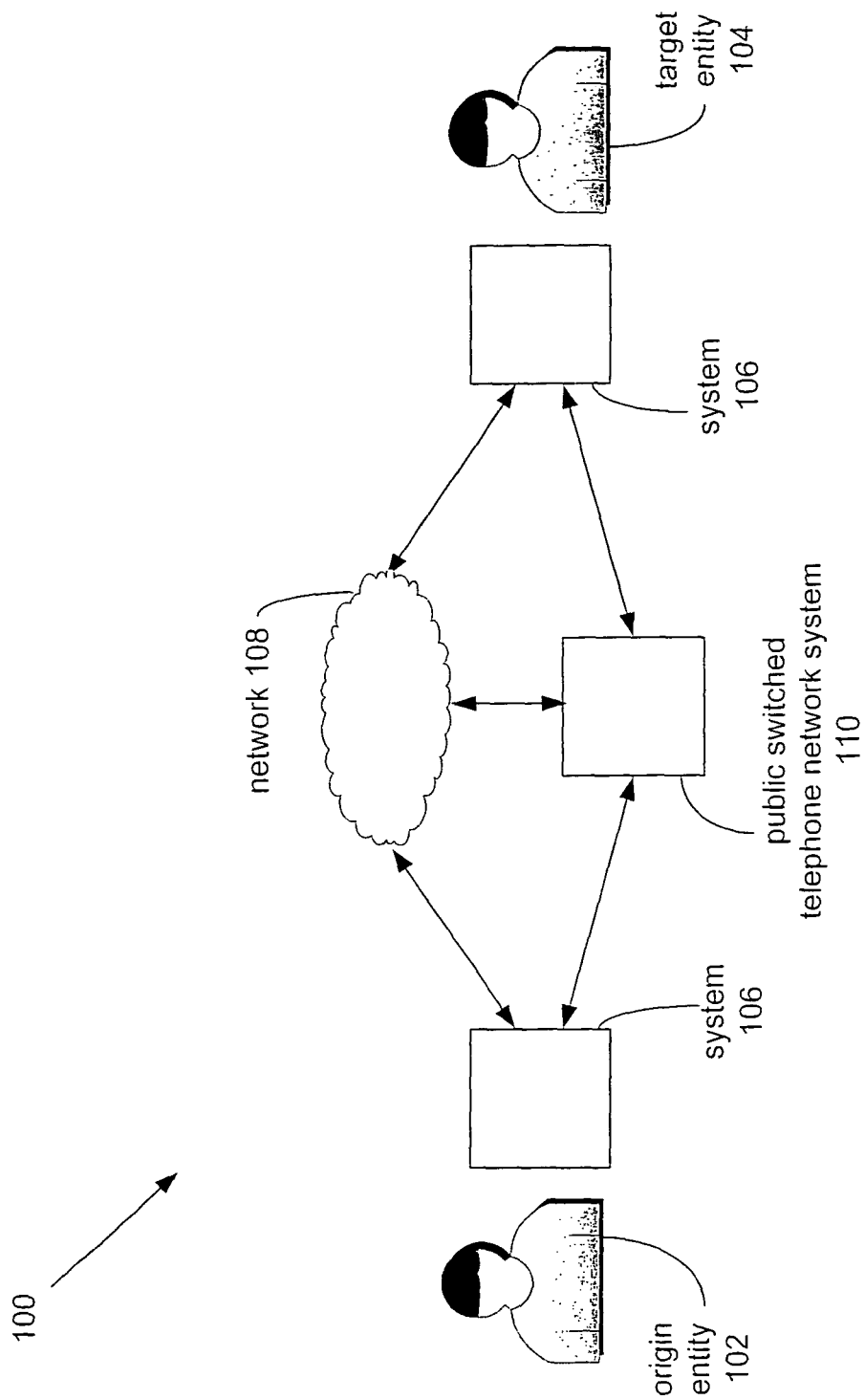
FIG. 1 depicts an exemplary environment in which the methods and systems described herein may be represented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 depicts an exemplary environment in which the methods and systems described herein may be represented.

In the exemplary environment 100, the origin entity 102 may be a person and/or an entity capable of communicating with other persons and/or entities. The origin entity 102 may include but is not limited to a single person, a group of two or more persons associated for the purpose of a communication (e.g., a group of three persons communicating with another person and/or group of persons to arrange a social gathering), and/or a one or more persons of a group of persons associated for one or more purposes or reasons (e.g., an employee or employees of a corporation, or members of a family) some or all of whom may participate in a communication on behalf of the association.

The target entity 104 may be a person and/or an entity capable of communicating with other persons and/or entities. The target entity 104 may include but is not limited to a single person, a group of two or more persons associated for the purpose of a communication (e.g., a group of three persons communicating with another person and/or group of persons to arrange a social gathering), and/or a one or more persons of a group of persons associated for one or more purposes or reasons (e.g., an employee or employees of a corporation, or members of a family) some or all of whom may participate in a communication on behalf of the association.

A communication or other event may take place between the origin entity 102 and the target entity 104 that prompts the origin entity 102 to select a communications context for communications with the target entity 104. Such communication may take place using means including but not limited to telephony (using the public switched telephone system, the internet (via, e.g., Voice over Internet Protocol ("VoIP"), or both), instant and/or text messaging, and/or electronic mail ("email"). Systems 106 represent any systems that have one or more communications devices including but not limited to a telephone, a VoIP endpoint, a computer running email and/or instant messaging software, and/or a personal digital assistant and/or a cell phone running text messaging software. The systems 106 are illustrated in the exemplary environment 100 in close physical proximity to the origin entity 102 and the target entity 104. Those skilled in the art will appreciate that one or more of the devices included in the systems 106 may be relatively distant but operably coupled to one or more devices included in the systems 106 and in physical proximity to the respective entities with which the systems 106 are associated (e.g., origin entity 102 and/or the target entity 104). The systems 106 may be operably coupled via some network or combinations of networks (e.g. the internet, a wireless network, an intranet, etc.), represented in the exemplary environment 100 by the network 108, and/or by public switched telephone network ("PSTN") devices represented by the PSTN system 110, and/or or by some combination of the network 108 and the PSTN 110. The operable couplings between the systems 106 may be tangible connections (e.g., wires and/or cables and/or fiber-optic lines), or intangible connections (e.g., wireless connections, e.g., radio-frequency connections between cell phone and cell network towers), and/or some combination of tangible connections and intangible connections.

The communications context may be defined in part by one or more communications context parameters, which may be associated with the relevant communications context. A communications context parameter may include but not be limited to one or more target entity parameters associated with a location of the target entity 104, a system associated with the target entity 104, and/or an identity of the target entity 104. For example, a communications context parameter may include but not be limited to one or more target entity parameters associated with (a) a location, such as the location at which the origin entity 102 met the target entity 104 and/or the location of the target entity 104 when the origin entity 102 and the target entity 104 first communicated, e.g., a business meeting or a social gathering, and/or one or more likely locations of the target entity 104 when further communications take place; (b) a system associated with the target entity 104 which the target entity 104 may use in communications with the origin entity 102, e.g., a telephone or a VoIP endpoint; or (c) an identity of the target entity 104, e.g., a name and/or nickname and/or code name and/or role (e.g., administrative assistant, salesman, engineer, etc.) of the target entity 104, a telephone number associated with the target entity 104, an Internet Protocol ("IP") address associated with a system associated with the target entity 104, and/or an electronic mail address associated with the target entity 104.

A communications context parameter may also include but not be limited to one or more indications of a relationship between the origin entity 102 and the target entity 104, e.g., business, family, social: one or more indications of a relative priority of communications between the origin entity 102 and the target entity 104, e.g., as compared with communications between the origin entity 102 and other parties besides the target entity 104, e.g., during business hours, communications with business associates are more important than communications with the target entity 104, a social contact, but during non-business hours, communications with the target entity 104 are more important than communications with business associates.

A communications context parameter may be stored using the memory resources and/or hardware and/or software and/or firmware ("hardware/software/firmware") of the system 106 associated with the origin entity 102 and/or memory resources and/or hardware/software/firmware operably coupled to the system 106 associated with the origin entity 102.

A communications context parameter may be fictional or real. A communications context parameter may be created from one or more of a number of sources or methods, including but not limited to random or pseudo-random generation or selection from a database. Within the communications context, the origin entity 102 may wish communications with the target identity 104 to be identified by one or more of the communications context parameters, e.g., to have one or more of the communications context parameters displayed using a caller identification feature associated with a system associated with the origin entity 102. Display of one or more selected real communications context parameters or one or more fictional communications context parameters may be desirable in a given communications context, e.g., for purposes of communications security and/or deception of persons proximate to or associated with the origin entity 102. For example, if a communication within a given communications context is a telephone call from the origin entity 102 to the target entity 104, a real or fictional communications context parameter including a target entity parameter associated with a false telephone number and/or a false name may give rise to a display feature via a user interface of a system 106 associated with the origin entity 102, e.g., text or graphics on the user interface system, for, e.g., verification of the communications context parameter, via text and/or graphics on a user interface of a system 106 associated with the origin entity 102, by the origin entity 102 and/or deception of persons proximate to or associated with the origin entity 102.

Within the communications context, the origin entity 102 may wish to be identified by one or more origin entity parameters associated with the relevant communications context and associated with (a) a location, such as an actual location of the origin entity 102 during a communication with the target entity 102 or a location (fictional or real) at which the origin entity is not located during a communication with the target entity 104 (e.g., for purposes of communications security during a confidential activity in which the origin entity 102 is involved, and/or for purposes of deception of the target entity 104 and/or of persons and/or entities proximate to or associated with the target entity 104); (b) a system (fictional or real) that is associated with the origin entity 102 or that the origin entity wishes the target entity 104 and/or persons proximate to or associated with the target entity 104 to believe is associated with the target entity 102 (e.g., for purposes of communications security during a confidential activity in which the origin entity 102 is involved, or for purposes of deception); or (c) an identity (fictional or real) that is associated with the origin entity 102 or that the origin entity wishes the target entity 104 and/or persons proximate to or associated with the target entity 104 to believe is associated with the target entity 102 (e.g., for purposes of communications security during a confidential activity in which the origin entity 102 is involved, or for purposes of deception), e.g., a name and/or nickname and/or code name of the origin entity 102, a telephone number nominally associated with the origin entity 102, an IP address associated with a system nominally associated with the origin entity 102, and/or an electronic mail address nominally associated with the origin entity 102.

A communications context identifier may be created from one or more of a number of sources or methods, including but not limited to random or pseudo-random generation or selection from a database.

A communications context identifier may be stored using the memory resources and/or hardware/software/firmware of the system 106 associated with the origin entity 102 and/or memory resources and/or hardware/software/firmware operably coupled to the system 106 associated with the origin entity 102.

A communications context identifier may be transmitted in conjunction with a communication within the communications context. For example, if the communications within the communications context is a telephone call reply from the origin entity 102 to the target entity 104 to a telephone call from the target entity 104 to the origin entity 102, a communications context identifier including an origin entity parameter associated with a false telephone number and/or a false name may be transmitted in conjunction with the reply telephone call, such that the false telephone number and false name, both associated with the origin entity 102, appear on a caller identification feature of the telephone of the target entity 104. Further, a communications context identifier may give rise to a display feature in conjunction with a communication within the communications context. For example, if the communication within the communications context is a VoIP call from the origin entity 102 to the target entity 104, a communications context identifier including an origin entity parameter associated with a false telephone number and/or a false name may be displayed in conjunction with the VoIP call, e.g., via text and/or graphics on a user interface of a system 106 associated with the origin entity 102, for purposes, e.g., of verification that the communications context identifier being transmitted to a target entity 104 is the communications context identifier desired by the origin entity 102.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
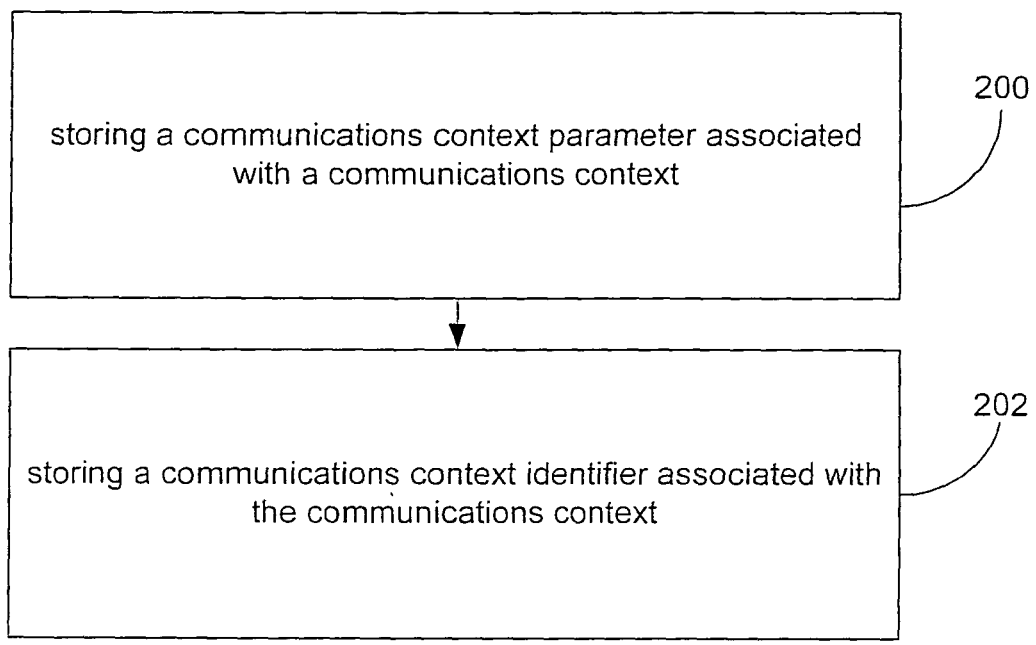
FIG. 2 depicts a high-level logic flowchart of an operational process.

FIG. 2 depicts a high-level logic flowchart of an operational process. The illustrated process may include operation 200 and/or operation 202.

Operation 200 shows storing a communications context parameter associated with a communications context. Operation 200 may include, for example, storing a communications context parameter associated with a communications context such as a name of a target entity 104 (e.g., a nickname or a code name), a location associated with the target entity 104 (e.g., a home, a wife's office, or a lovers' hideaway), and/or a system associated with the target entity 104 (e.g., a cell phone or a computer at a home), where the communications context parameter is associated with a communications context such as a context in which communications (e.g., phone calls, instant and/or text messaging, and/or emails) may be conducted with a person or entity (e.g., a spouse, a business partner, a lover, and/or an investigation subject). This context may include but is not limited to one or more situations in which an origin entity 102 may communicate with a target entity 104 where the origin entity 102 may wish to exercise discretion (e.g., for a confidential communication) and/or deception of the target entity 104 and/or of persons and/or entities proximate to or associated with the target entity 104 (e.g., for a communication with a lover, or an investigation subject such as a crime suspect where the origin entity is a policeman).

The storing of operation 200 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 202 illustrates storing a communications context identifier associated with the communications context. Operation 202 may include, for instance, storing a communications context identifier associated with the communications context such as a name of the origin entity 102 (e.g., a nickname or code name), a location associated with the origin entity 102 (e.g., a home of a person associated with the origin entity 102, the office of the origin entity 102), and/or a system associated the origin entity 102 (e.g., a personal computer used for VoIP calls by the origin entity 102, or the cell phone of the origin entity 102), where the communications context parameter is associated with a communications context such as a context in which communications (e.g., phone calls, instant and/or text messaging, and/or emails) may be conducted with a person or entity (e.g., a boyfriend and/or girlfriend, a business associate, a lover, and/or an investigation subject). This context may include but is not limited to one or more situations in which an origin entity 102 may communicate with a target entity 104 where the origin entity 102 may wish to exercise discretion (e.g., for a confidential communication) and/or deception of the target entity 104 and/or of persons and/or entities proximate to or associated with the target entity 104 (e.g., for a communication with a negotiating partner in a concealed business deal, or an investigation subject such as a crime suspect where the origin entity is a policeman).

The storing of operation 202 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

FIG. 3 depicts several alternative implementations of the high-level logic flowchart of FIG. 2. Operation 200—storing a communications context parameter associated with a communications context—may include one or more of the following operations: 300, 302, 304, 306, 308, 310, and/or 312.

Operation 300 shows storing the communications context parameter, wherein the communications context parameter includes a target entity parameter associated with a location associated with a target entity. Operation 300 may include, for example, storing the communications context parameter, wherein the communications context parameter includes a target entity parameter associated with a location associated with a target entity, where the target entity parameter is associated with a location associated with a target entity 104, such as the home of the target entity 104, the office of the target entity 104, some location frequented by the target entity 104, or a location designated as the location from which the target entity 104 is to communicate with the origin entity 102. The location may be a location at which the target entity 104 may actually be located or a location at which the target entity 104 may not actually be located but which is associated with the target entity 104 for purposes of confidentiality and/or deception, including a fictitious location.

The storing of operation 300 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 302 illustrates storing the communications context parameter, wherein the communications context parameter includes a target entity parameter associated with a system associated with the target entity. Operation 302 may include, for example, storing the communications context parameter, wherein the communications context parameter includes a target entity parameter associated with a system associated with the target entity, where the target entity parameter is associated with a system 106 associated with a target entity 104, such as a personal computer that the target entity 104 uses to make VoIP calls, a cell phone of the target entity 104, a computer from which the target entity sends and receives emails, or the personal digital assistant with which the target entity 104 sends and receives text messages.

The storing of operation 302 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 304 depicts storing the communications context parameter, wherein the communications context parameter includes a target entity parameter associated with an identity of a target entity. Operation 304 may include, for instance, storing the communications context parameter, wherein the communications context parameter includes a target entity parameter associated with an identity of a target entity, where the target entity parameter is associated with an identity of a target entity 104, such as a name and/or a nickname and/or a code name and/or an alphanumeric designator that serves to distinguish the target entity 104 from other entities. The target entity parameter associated with an identity of the target entity 104 may be real, e.g., a real name of the target entity 104, or fictional, e.g., an assumed name or a name designed to deceive and/or mislead, and/or some alphanumeric designation.

The storing of operation 304 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 306 depicts storing the communications context parameter, wherein at least a portion of the communications context parameter is randomly generated. Operation 306 may include, for instance, storing the communications context parameter, wherein at least a portion of the communications context parameter is randomly generated, such as a part of a target entity parameter included in a communications context parameter that is the output of a computational process that generates a random number that is used to generate a random name and/or a random alphanumeric designator.

The storing and/or the random generating of operation 306 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 308 depicts storing the communications context parameter, wherein at least a portion of the communications context parameter is pseudo-randomly generated. Operation 308 may include, for instance, storing the communications context parameter, wherein at least a portion of the communications context parameter is pseudo-randomly generated, such as a part of a target entity parameter included in a communications context parameter that is the output of a computational process that generates a pseudo-random number that is used to generate a pseudo-random name and/or a pseudo-random alphanumeric designator.

The storing and/or the pseudo-random generating of operation 308 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 310 illustrates storing the communications context parameter, wherein at least a portion of the target entity parameter is selected from a database. Operation 310 may include, for instance, storing the communications context parameter, wherein at least a portion of the target entity parameter is selected from a database, such as a part of a target entity parameter included in a communications context parameter that is a selection from a database of possible names and/or alphanumeric designators. The selection may be based, e.g., on one or more predetermined selection criteria and/or on random and/or pseudo-random selection.

The storing and/or the selection of operation 310 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 312 shows storing the communications context parameter, wherein the communications context parameter may be displayed in conjunction with a communication in the communications context. Operation 312 may include, for example, storing the communications context parameter, wherein the communications context parameter may be displayed in conjunction with a communication in the communications context, where the communications context parameter may give rise to a display in conjunction with a communication between the target entity 104 and the origin entity 102 on a display feature of a system 106 associated with the origin entity 102, e.g., a code name associated with the target entity 104 is displayed on the caller identification feature of a telephone of the origin entity 102 when the target entity 104 places a telephone call to the telephone of the origin entity 102.

The storing and/or the display of operation 312 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

FIG. 4 depicts several alternative implementations of the high-level logic flowchart of FIG. 3. Operation 304—storing the communications context parameter, wherein the communications context parameter includes a target entity parameter associated with an identity of a target entity—may include one or more of the following operations: 400, 402, 404, and/or 406.

Operation 400 shows storing the communications context parameter, wherein the target entity parameter includes a name associated with the identity of the target entity. Operation 400 may include, for instance, storing the communications context parameter, wherein the target entity parameter includes a name associated with the identity of the target entity, where the target entity parameter includes a real or fictitious name and/or nickname and/or code name associated with a system 106, e.g., a telephone and/or personal computer and/or personal digital assistant, associated with the target entity 104.

The storing of operation 400 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 402 illustrates storing the communications context parameter, wherein the target entity parameter includes a telephone number associated with the identity of the target entity. Operation 402 may include, for example, storing the communications context parameter, wherein the target entity parameter includes a telephone number associated with the identity of the target entity, where the target entity parameter includes a real or fictitious telephone number associated with a system 106, e.g., a telephone and/or personal computer and/or personal digital assistant, associated with the target entity 104.

The storing of operation 402 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 404 depicts storing the communications context parameter, wherein the target entity parameter includes an Internet Protocol address associated with the identity of the target entity. Operation 404 may include, for instance, storing the communications context parameter, wherein the target entity parameter includes an Internet Protocol address associated with the identity of the target entity, where the target entity parameter includes a real or fictitious Internet Protocol address associated with a system 106, e.g., a personal computer, associated with the target entity 104 and used by the target entity 104 for VoIP calls and/or emailing and/or instant messaging.

The storing of operation 404 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 406 shows storing the communications context parameter, wherein the target entity parameter includes an electronic mail address associated with the identity of the target entity. Operation 406 may include, for example, storing the communications context parameter, wherein the target entity parameter includes an electronic mail address associated with the identity of the target entity, where the target entity parameter includes a real or fictitious email address associated with a target entity 104.

The storing of operation 406 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Figure 5A:
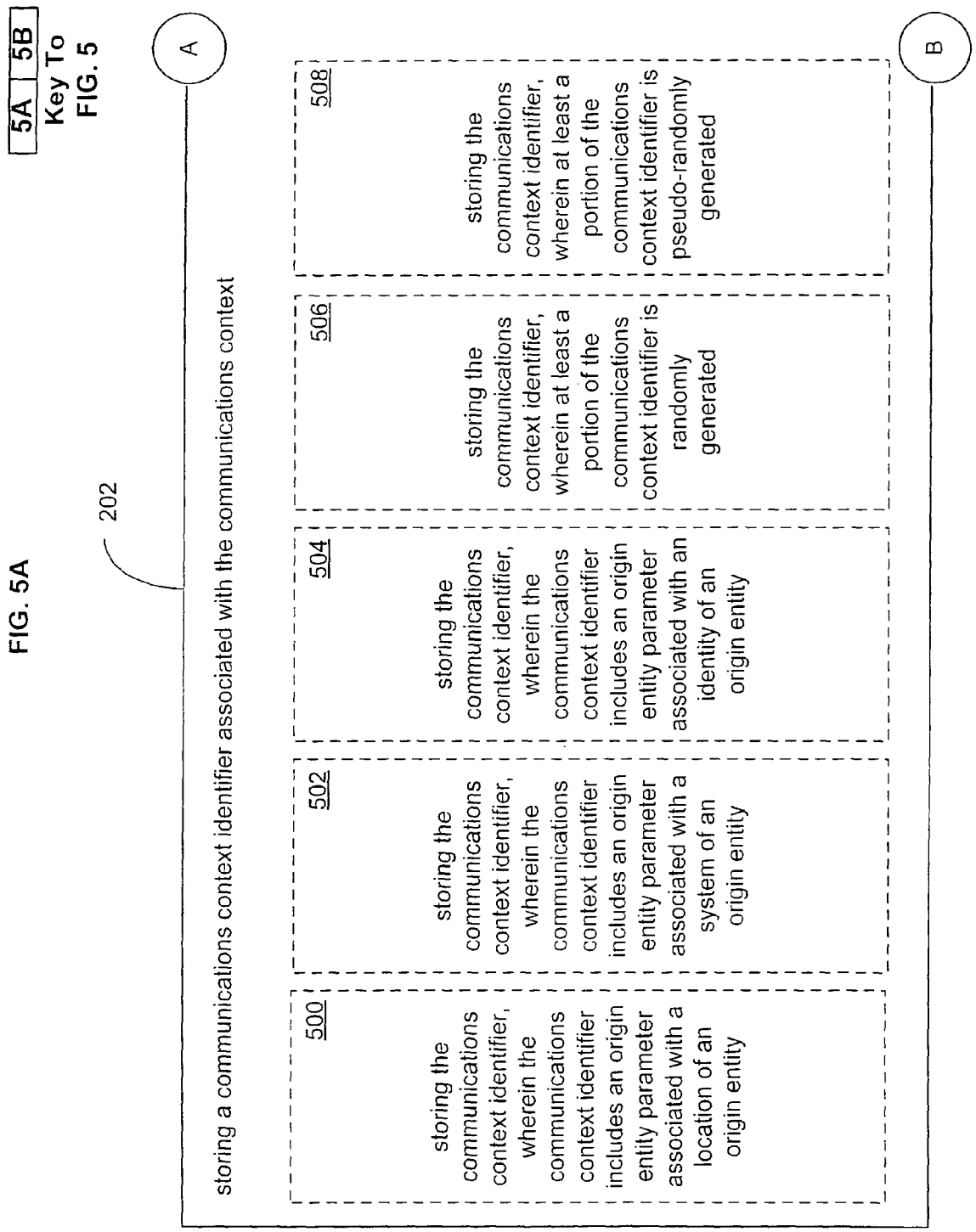
FIG. 5 depicts several alternative implementations of the high-level logic flowchart of FIG. 2.

FIG. 5 depicts several alternative implementations of the high-level logic flowchart of FIG. 2. Operation 202—storing a communications context identifier associated with the communications context—may include one or more of the following operations: 500, 502, 504, 506, 508, 510, and/or 512.

Operation 500 illustrates storing the communications context identifier, wherein the communications context identifier includes an origin entity parameter associated with a location of an origin entity. Operation 500 may include, for instance, storing the communications context identifier, wherein the communications context identifier includes an origin entity parameter associated with a location of an origin entity, where the origin entity parameter is associated with a location associated with an origin entity 102, such as the office of the origin, some location frequented by the origin entity 102, and/or a location designated by the target entity as a location from which the origin entity 102 is to communicate with the target entity 104. The location may be a location at which the origin entity 102 may actually be located or a location at which the origin entity 102 may not actually be located but which is associated with the origin entity 102 for purposes of confidentiality and/or deception, including a fictitious location.

The storing of operation 500 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 502 shows storing the communications context identifier, wherein the communications context identifier includes an origin entity parameter associated with a system of an origin entity. Operation 502 may include, for instance, storing the communications context identifier, wherein the communications context identifier includes an origin entity parameter associated with a system of an origin entity, where the origin entity parameter is associated with a system 106 associated with an origin entity 102, such as a cell phone of the origin entity 102, a personal computer that the origin entity 102 uses to make VoIP calls, a computer from which the origin entity sends and receives instant messages. The system 106 may actually be a system 106 that may be used by the origin entity 102 or a system 106 that may not actually be used by the origin entity 102 but is associated with the origin entity 102 for purposes of confidentiality and/or deception, including a fictitious system 106.

The storing of operation 502 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 504 depicts storing the communications context identifier, wherein the communications context identifier includes an origin entity parameter associated with an identity of an origin entity. Operation 504 may include, for instance, storing the communications context identifier, wherein the communications context identifier includes an origin entity parameter associated with an identity of an origin entity, where the origin entity parameter is associated with an identity of an origin entity 102, such as a name and/or a nickname and/or a code name and/or an alphanumeric designator that serves to distinguish the origin entity 102 from other entities. The origin entity parameter associated with an identity of the origin entity 102 may be real, e.g., a real name of the origin entity 104, or fictional, e.g., an assumed name or a name designed to deceive and/or mislead, and/or some alphanumeric designation.

The storing of operation 504 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 506 depicts storing the communications context identifier, wherein at least a portion of the communications context identifier is randomly generated. Operation 506 may include, for instance, storing the communications context identifier, wherein at least a portion of the communications context identifier is randomly generated, such as a part of an origin entity parameter included in a communications context parameter that is the output of a computational process that generates a random number that is used to generate a random name and/or a random alphanumeric designator.

The storing and/or the random generating of operation 506 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 508 shows storing the communications context identifier, wherein at least a portion of the communications context identifier is pseudo-randomly generated. Operation 508 may include, for instance, storing the communications context identifier, wherein at least a portion of the communications context identifier is pseudo-randomly generated, such as a part of an origin entity parameter included in a communications context identifier that is the output of a computational process that generates a pseudo-random number that is used to generate a pseudo-random name and/or a pseudo-random alphanumeric designator.

The storing and/or the pseudo-random generating of operation 508 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 510 depicts storing the communications context identifier, wherein at least a portion of the communications context identifier is selected from a database. Operation 510 may include, for instance, storing the communications context identifier, wherein at least a portion of the communications context identifier is selected from a database, such as a part of an origin entity parameter included in a communications context identifier that is a selection from a database of possible names and/or alphanumeric designators. The selection may be based, e.g., on one or more predetermined selection criteria and/or on random and/or pseudo-random selection.

The storing and/or the selection of operation 510 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 512 illustrates storing the communications context identifier, wherein the communications context identifier may be transmitted in conjunction with a communication in the communications context. Operation 512 may include, for example, storing the communications context identifier, wherein the communications context identifier may be transmitted in conjunction with a communication in the communications context, where the communications context identifier may be transmitted in conjunction with a communication between the origin entity 102 and the target entity 104 and may give rise to a display feature of a system 106 associated with the target entity 104, e.g., a code name associated with the origin entity 102 may be displayed on the caller identification feature of a telephone of the target entity 104 when the origin entity 102 places a telephone call to the telephone of the target entity 104 in conjunction with the code name of the origin entity 102. Further, the communications context identifier that may be transmitted in conjunction with the communications context may give rise to a display feature of a system 106 associated with the origin entity 102, e.g., initiating the display of text and/or graphics on a display system of a system 106 associated with the origin entity 102, for purposes of, e.g., verifying the communications context identifier that may be transmitted, and/or informing and/or deceiving entities proximate to or associated with the origin entity 102.

The storing and/or the transmission of operation 512 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Figure 6:
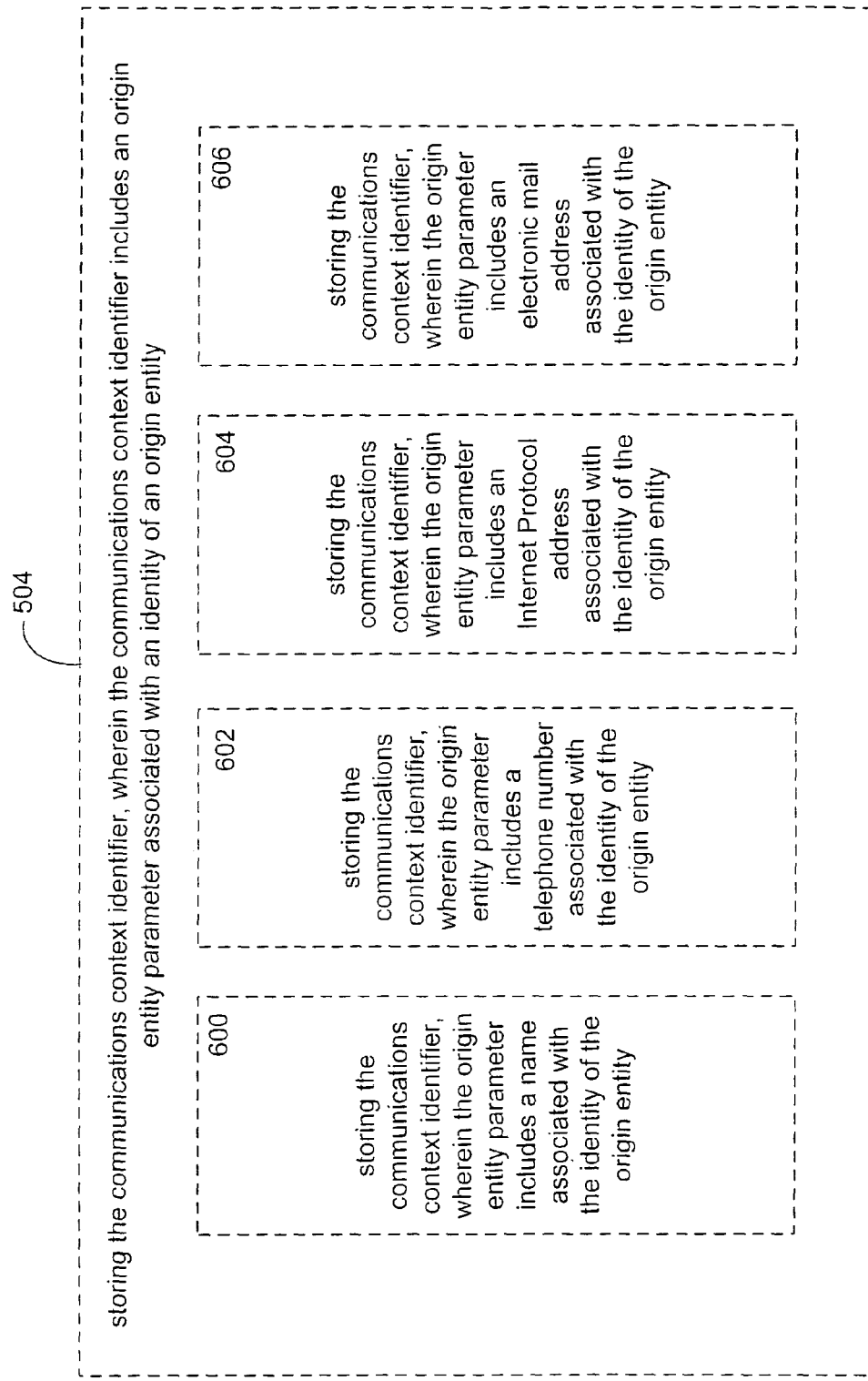
FIG. 6 depicts several alternative implementations of the high-level logic flowchart of FIG. 5.

FIG. 6 depicts several alternative implementations of the high-level logic flowchart of FIG. 5. Operation 504—storing the communications context identifier, wherein the communications context identifier includes an origin entity parameter associated with an identity of an origin entity—may include operations 600, 602, 604, and/or 606.

Operation 600 shows storing the communications context identifier, wherein the origin entity parameter includes a name associated with the identity of the origin entity. Operation 600 may include, for instance, storing the communications context identifier, wherein the origin entity parameter includes a name associated with the identity of the origin entity, where the origin entity parameter includes a real or fictitious name and/or nickname and/or code name associated with a system 106, e.g., a telephone and/or personal computer and/or personal digital assistant, associated with the origin entity 102.

The storing of operation 600 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 602 illustrates storing the communications context identifier, wherein the origin entity parameter includes a telephone number associated with the identity of the origin entity. Operation 602 may include, for example, storing the communications context identifier, wherein the origin entity parameter includes a telephone number associated with the identity of the origin entity, where the origin entity parameter includes a real or fictitious telephone number associated with a system 106, e.g., a telephone and/or personal computer and/or personal digital assistant, associated with the origin entity 102.

The storing of operation 602 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 604 depicts storing the communications context identifier, wherein the origin entity parameter includes an Internet Protocol address associated with the identity of the origin entity. Operation 604 may include, for instance, storing the communications context identifier, wherein the origin entity parameter includes an Internet Protocol address associated with the identity of the origin entity, where the origin entity parameter includes a real or fictitious Internet Protocol address associated with a system 106, e.g., a personal computer, associated with the origin entity 102 and used by the origin entity 102 for VoIP calls and/or emailing and/or instant messaging.

The storing of operation 604 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Operation 606 shows storing the communications context identifier, wherein the origin entity parameter includes an electronic mail address associated with the identity of the origin entity. Operation 606 may include, for example, storing the communications context identifier, wherein the origin entity parameter includes an electronic mail address associated with the identity of the origin entity, where the target entity parameter includes a real or fictitious email address associated with an origin entity 102.

The storing of operation 606 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using memory resources of the system 106 associated with the origin entity 102 and/or the memory resources of a system and/or systems associated with the system 106 associated with the origin entity 102.

Figure 7:
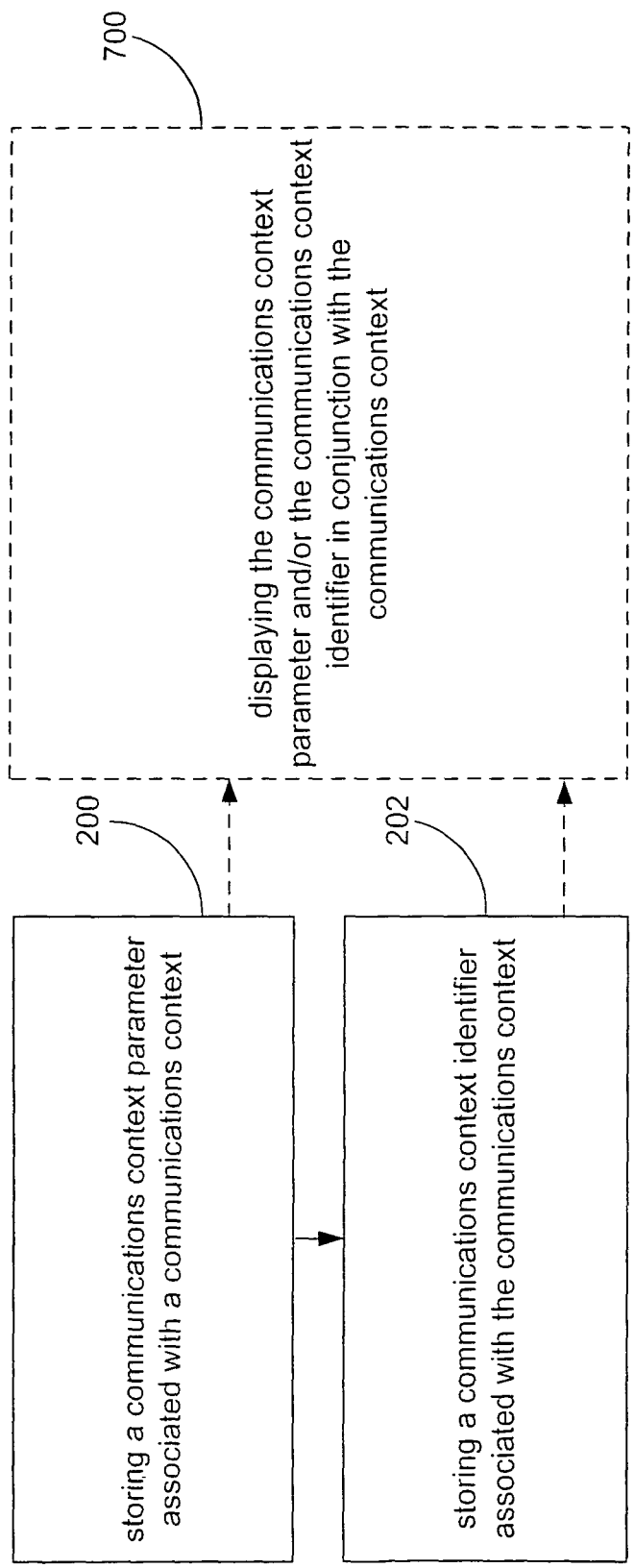
FIG. 7 depicts a high-level logic flowchart of an operational process.

FIG. 7 depicts a high-level logic flowchart of an operational process. The depicted process may include one or more of the following operations: 200 (described elsewhere herein), 202 (described elsewhere herein), and/or 700.

Operation 700 depicts displaying the communications context parameter and/or the communications context identifier in conjunction with the communications context. Operation 700 may include, for example, displaying the communications context parameter and/or the communications context identifier in conjunction with the communications context, such as displaying one or more target entity parameters, e.g., a telephone number, name, address, etc., on the caller identification feature of a system 106, such as a telephone, associated with an origin entity 102, in conjunction with a communication, e.g., a telephone call from a target entity 104 to an origin entity 102. Alternatively and/or in conjunction with the foregoing, operation 700 may include, for example, displaying one or more origin entity parameters, e.g., a fake telephone number, name, and/or location (e.g., physical location), etc. that were previously generated responsive to the one or more target entity parameters (e.g., such as might be used by undercover law enforcement), on the caller identification feature of a system 106, such as a telephone, associated with an origin entity 102, in conjunction with a communication, e.g., a telephone call between a target entity 104 to an origin entity 102.

The displaying of operation 700 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using one or more display features and/or hardware/software/firmware of the system 106 associated with the origin entity 102.

Figure 8A:
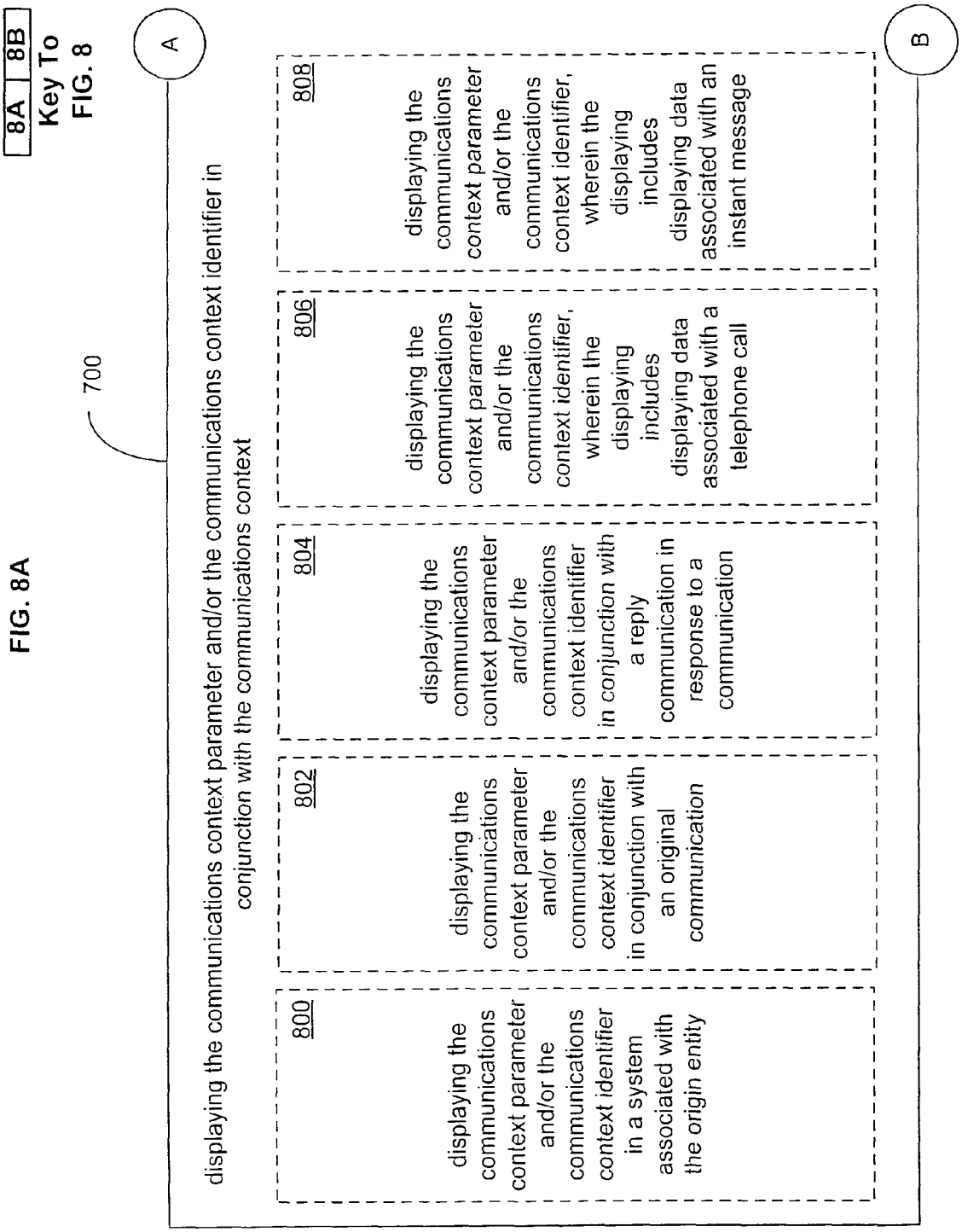
FIG. 8 depicts several alternative implementations of the high-level logic flowchart of FIG. 7.

FIG. 8 depicts several alternative implementations of the high-level logic flowchart of FIG. 7. Operation 700—displaying the communications context parameter and/or the communications context identifier in conjunction with the communications context—may include one or more of the following operations: 800, 802, 804, 806, 808, 810, and/or 812.

Operation 800 depicts displaying the communications context parameter and/or the communications context identifier in a system associated with the origin entity. Operation 800 may include, for instance, displaying the communications context parameter and/or the communications context identifier in a system associated with the origin entity, such as displaying one or more communications context parameters including one or more target entity parameters and/or the one or more communications context identifiers including one or more origin entity parameters on a display feature of a system 106 associated with an origin entity 102, such as a personal digital assistant used by the origin entity 102 to send and receive text messages. Operation 800 may also include, for instance, displaying one or more communications context identifiers including one or more origin entire parameters associated with one or more communications context parameters including one or more target entity parameters; for example, displaying an origin-entity name, origin-entity occupation, origin-entity phone number, origin-entity email address, etc. in conjunction with a target-entity name, target-entity occupation, target-entity phone number, target-entity email address, etc. (e.g., such as origin entity 102 might have given to target entity 104 when the two met at a defined location in space and/or time (e.g., at a bar and/or in cyberspace on a particular date)). The one or more communications context identifiers including one or more origin entity parameters and/or one or more communications context parameters including one or more target entity parameters may be displayed on a display feature of a system 106 associated with the origin entity 102, such as the caller ID display of a telephone.

The displaying of operation 800 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using one or more display features and/or hardware/software/firmware of the system 106 associated with the origin entity 102.

Operation 802 illustrates displaying the communications context parameter and/or the communications context identifier in conjunction with an original communication. Operation 802 may include, for instance, displaying the communications context parameter and/or the communications context identifier in conjunction with an original communication, such as displaying one or more communications context parameters including one or more target entity parameters and/or the one or more communications context identifiers including one or more origin entity parameters in conjunction with an original email (e.g., one not sent in response to a communication) sent from a target entity 104 to an origin entity 102. Operation 802 may also include, for example, displaying one or more communications context identifiers including one or more origin entity parameters associated with one or more communications context parameters including one or more target entity parameters in conjunction with an original VoIP call (e.g., one not made in response to a communication) between a target entity 104 and an origin entity 102; for example displaying, in conjunction with an original VoIP call, the name, location (e.g., space (e.g., physical/virtual) location and/or time location), telephone number, IP address, electronic mail address, etc. in conjunction with the name and/or spacetime location that are associated with target entity 104 by origin entity 102 (e.g., such as origin entity 102 might previously have given out to target entity 104 at the time that origin entity 102 met target entity 104). For example displaying "you met John Smith (exemplary of a name associated with target entity 104) at Starbucks in Washington D.C. (exemplary of a space location associated with target entity 104) on 12 Sep. 2006 (exemplary of a time location associated with target entity 104), and at that time you told him that your name was Mark Hamilton, that you lived in Maryland, and that you worked as a carpenter, and that your VoIP number was 111-111-1111 (exemplary of an origin entity 102 name, location (space-time), and phone number associated with a target entity 102 name and space-time location as set forth in the foregoing)."

The displaying of operation 802 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using one or more display features and/or hardware/software/firmware of the system 106 associated with the origin entity 102.

Operation 804 shows displaying the communications context parameter and/or the communications context identifier in conjunction with a reply communication in response to a communication. Operation 804 may include, for example, displaying the communications context parameter and/or the communications context identifier in conjunction with a reply communication in response to a communication, such as displaying one or more communications context parameters including one or more target entity parameters and/or one or more communications context identifiers including one or more origin entity parameters in conjunction with a reply text message (e.g., a text message sent in reply to a previous communication) between a target entity 104 and an origin entity 102. Operation 804 may also include, for instance, displaying one or more communications context identifiers including one or more origin entity parameters in conjunction with one or more communications context parameters including one or more target entity parameters in conjunction with a reply voicemail message between a target entity 104 and an origin entity 102; for example, displaying, in conjunction with a voicemail message, a spurious origin-entity phone number of origin entity 102 in association with an identity, location (e.g., space and/or time), role, phone number, etc. of target entity 104 (e.g., such as origin entity 102 might have given target entity 104 in the context of a business meeting).

The displaying of operation 804 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using one or more display features and/or hardware/software/firmware of the system 106 associated with the origin entity 102.

Operation 806 depicts displaying the communications context parameter and/or the communications context identifier, wherein the displaying includes displaying data associated with a telephone call. Operation 806 may include, for instance, displaying the communications context parameter and/or the communications context identifier, wherein the displaying includes displaying data associated with a telephone call, such as displaying one or more communications context parameters including one or more target entity parameters and/or one or more communications context identifiers including one or more origin entity parameters in conjunction with a telephone number associated with the target entity 104 during a telephone call and/or a VoIP call between the target entity 104 and the origin entity 102, where the displaying uses a caller identification feature of a system 106, e.g., a telephone and/or a VoIP endpoint, associated with the origin entity 102. Operation 806 may also include, for example, displaying the communications context parameter and/or the communications context identifier, wherein the displaying includes displaying data associated with a telephone call, such as displaying, in the context of a VoIP call between origin entity 102 and target entity 104, a fictitious origin-entity IP address that the origin entity 102 had previously associated with an IP address of target entity 104 and that system 106 is presenting to target entity 104 (e.g., allowing origin entity 102 to determine what he/she "looks like" to target entity 104). The communications context identifier including one or more origin entity parameters may be tied to one or more communications context parameters including one or more target entity parameters and may be displayed on a display feature of a system 106 associated with the origin entity 102, such as the display screen of a cell phone.

The displaying of operation 806 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using one or more display features and/or hardware/software/firmware are of the system 106 associated with the origin entity 102.

Operation 808 depicts displaying the communications context parameter and/or the communications context identifier, wherein the displaying includes displaying data associated with an instant message. Operation 808 may include, for instance, displaying the communications context parameter and/or the communications context identifier, wherein the displaying includes displaying data associated with an instant message, such as displaying one or more communications context parameters including one or more target entity parameters and/or one or more communications context identifiers including one or more origin entity parameters in conjunction with an instant message between the target entity 104 and the origin entity 102. For example, displaying a nickname associated with the target entity 104 in conjunction with an instant message between the target entity 104 and the origin entity 102, where the nickname is displayed using the display screen of a system 106, e.g., a laptop computer, associated with the origin entity 102. Operation 808 may also include, for example, displaying the communications context parameter and/or the communications context identifier, wherein the displaying includes displaying data associated with an instant message, such as displaying a specialized origin-entity nickname that the origin entity 102 had previously associated with an IP address of target entity 104 for the purpose of misleading the target entity 104 in, e.g., a law enforcement operation, so that the origin entity 102 may verify the nickname (e.g., allowing origin entity 102 to determine what he/she "looks like" to target entity 104). The communications context identifier including one or more origin entity parameters may be tied to one or more communications context parameters including one or more target entity parameters and may be displayed on a display feature of a system 106 associated with the origin entity 102, such as the display screen of a personal computer.

The displaying of operation 808 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using one or more display features and/or hardware/software/firmware of the system 106 associated with the origin entity 102.

Operation 810 illustrates displaying the communications context parameter and/or the communications context identifier, wherein the displaying includes displaying data associated with a text message. Operation 810 may include, for example, displaying the communications context parameter and/or the communications context identifier, wherein the displaying includes displaying data associated with a text message, such as displaying one or more communications context parameters including one or more target entity parameters and/or one or more communications context identifiers including one or more origin entity parameters in conjunction with an alphanumeric code related to a text message between the target entity 104 and the origin entity 102, where the alphanumeric code is displayed using the display screen of a system 106, e.g., a personal digital assistant, associated with the origin entity 102. Operation 810 may also include, for instance, displaying the communications context parameter and/or the communications context identifier, wherein the displaying includes displaying data associated with a text message, such as displaying, in the context of a text message between origin entity 102 and target entity 104, an actual but misleading origin-entity telephone number associated with the origin entity 102 (e.g., a telephone number for a system 106 associated with origin entity 102), where the origin entity 102 had previously associated the system identifier with an identity of the target entity 104, so that the origin entity 102 may verify the origin-entity telephone number that is being presented to target entity 104.

The displaying of operation 810 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using one or more display features and/or hardware/software/firmware of the system 106 associated with the origin entity 102.

Operation 812 shows displaying the communications context parameter and/or the communications context identifier, wherein the displaying includes displaying data associated with an electronic mail message. Operation 812 may include, for instance, displaying the communications context parameter and/or the communications context identifier, wherein the displaying includes displaying data associated with an electronic mail message, such as displaying one or more communications context parameters including one or more target entity parameters and/or one or more communications context identifiers including one or more origin entity parameters in conjunction with an email address associated with an email between the target entity 104 and the origin entity 102, where the email address is displayed using the display screen of a system 106, e.g., a cell phone, associated with the origin entity 102. Operation 812 may also include, for example, displaying the communications context parameter and/or the communications context identifier, wherein the displaying includes displaying data associated with an electronic mail message, such as displaying in the context of an email between the origin entity 102 and the target entity 104 a specialized origin-entity email address that the origin entity 102 had previously associated with an email address of the target entity 104, so that the origin entity 102 may verify the specialized origin-entity email address previously associated with the email address of the target entity 104.

The displaying of operation 812 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using one or more display features and/or hardware/software/firmware of the system 106 associated with the origin entity 102.

Figure 9:
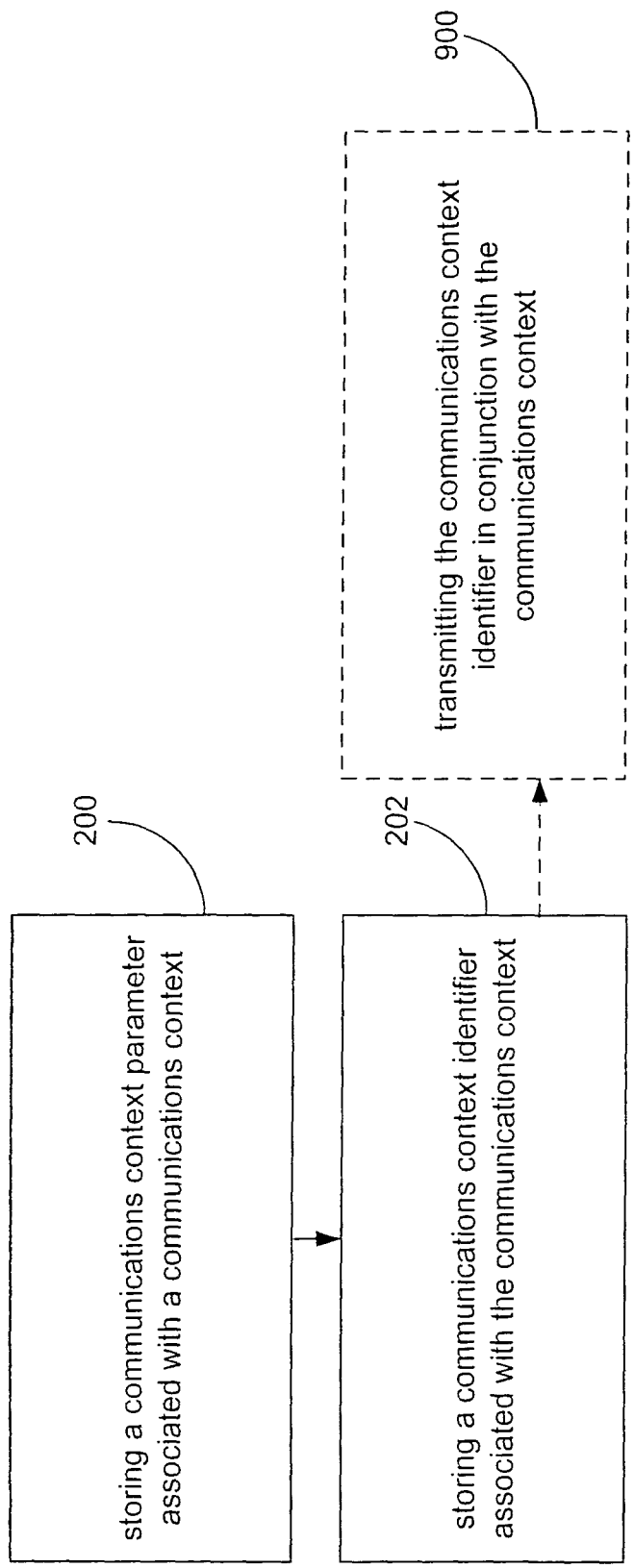
FIG. 9 depicts a high-level logic flowchart of an operational process.

FIG. 9 depicts a high-level logic flowchart of an operational process. The depicted process may include one or more of the following operations: 200 (described elsewhere herein), 202 (described elsewhere herein), and/or 900.

Operation 900 depicts transmitting the communications context identifier in conjunction with the communications context. Operation 900 may include, for instance, transmitting the communications context identifier in conjunction with the communications context, such as transmitting an origin entity parameter, e.g., an Internet Protocol address, on a display feature of a system 106, such as a personal computer display screen, associated with an origin entity 102, in conjunction with a communication, e.g., a VoIP call from a target entity 104 to an origin entity 102. Further, use of the communications context identifier transmitted in conjunction with the communications context may give rise to a display feature of a system 106 associated with the origin entity 102, e.g., initiating the display of text and/or graphics denoting the communications context identifier on a display system of a system 106 associated with the origin entity 102, for purposes of, e.g., verifying the communications context identifier transmitted, and/or informing and/or deceiving entities proximate to or associated with the origin entity 102. Such use of the communications context identifier transmitted in conjunction with the communications context may give rise to a display feature, e.g., in conjunction with an original communication, in conjunction with a reply communication in response to an incoming communication, in conjunction with transmitting data associated with a telephone call, in conjunction with transmitting data associated with an instant message, in conjunction with transmitting data associated with a text message, and/or in conjunction with transmitting data associated with an electronic mail message.

The transmitting of operation 900 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using hardware/software/firmware of the system 106 associated with the origin entity 102.

FIG. 10 depicts several alternative implementations of the high-level logic flowchart of FIG. 9. Operation 900—transmitting the communications context identifier in conjunction with the communications context—may include one or more of the following operations: 1000, 1002, 1004, 1006, 1008, and/or 1010.

Operation 1000 depicts transmitting the communications context identifier in conjunction with an original communication. Operation 1000 may include, for example, transmitting the communications context identifier in conjunction with an original communication, such as transmitting a communications context parameter including a target entity parameter in conjunction with an original instant message (e.g., one not sent in response to a communication) sent from an origin entity 102 to a target entity 104, using a system 106, e.g., a laptop computer, associated with the origin entity 102.

The transmitting of operation 1000 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using hardware/software/firmware of the system 106 associated with the origin entity 102.

Operation 1002 illustrates transmitting the communications context identifier in conjunction with a reply communication in response to an incoming communication. Operation 1002 may include, for example, transmitting the communications context identifier in conjunction with a reply communication in response to an incoming communication, such as a communications context parameter including a target entity parameter in conjunction with a reply VoIP call (e.g., a VoIP call made in reply to a previous communication) from an origin entity 102 to a target entity 104, using system 106, e.g., a personal computer, associated with the origin entity 102.

The transmitting of operation 1002 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using hardware/software/firmware of the system 106 associated with the origin entity 102.

Operation 1004 illustrates transmitting the communications context identifier, wherein the transmitting includes transmitting data associated with a telephone call. Operation 1004 may include, for example, transmitting the communications context identifier, wherein the transmitting includes transmitting data associated with a telephone call, such as a nickname associated with the origin entity 102 in conjunction with a telephone call and/or a VoIP call from the origin entity 102 to the target entity 104, using a system 106, e.g., a telephone or a VoIP endpoint, associated with the origin entity 102.

The transmitting of operation 1004 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using hardware/software/firmware of the system 106 associated with the origin entity 102.

Operation 1006 shows transmitting the communications context identifier, wherein the transmitting includes transmitting data associated with an instant message. Operation 1006 may include, for instance, transmitting the communications context identifier, wherein the transmitting includes transmitting data associated with an instant message, such as a nickname associated with the origin entity 102 in conjunction with an instant message sent from the origin entity 102 to the target entity 104, using a system 106, e.g., a laptop computer, associated with the origin entity 102.

The transmitting of operation 1006 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using hardware/software/firmware of the system 106 associated with the origin entity 102.

Operation 1008 depicts transmitting the communications context identifier, wherein the transmitting includes transmitting data associated with a text message. Operation 1008 may include, for example, transmitting the communications context identifier, wherein the transmitting includes transmitting data associated with a text message, such as a code name associated with the origin entity 102 in conjunction with a text message sent from the origin entity 102 to the target entity 104, using a system 106, e.g., a personal digital assistant, associated with the origin entity 102.

The transmitting of operation 1008 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using hardware/software/firmware of the system 106 associated with the origin entity 102.

Operation 1010 shows transmitting the communications context identifier, wherein the transmitting includes transmitting data associated with an electronic mail message. Operation 1010 may include, for instance, transmitting the communications context identifier, wherein the transmitting includes transmitting data associated with an electronic mail message, such as an email address associated with the origin entity 102 in conjunction with an email from the origin entity 102 to the target entity 104, using a system 106, e.g., a laptop computer, associated with the origin entity 102.

The transmitting of operation 1010 may be performed, e.g., upon initiation by the origin entity 102 and/or upon initiation by automated action of hardware/software/firmware of a system 106 associated with the origin entity 102 and/or by hardware/software/firmware of a system and/or systems operably coupled to the system 106 associated with the origin entity 102, using hardware/software/firmware of the system 106 associated with the origin entity 102.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (Asics), Field Programmable Gate Arrays (Fogs), digital signal processors (Dips), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/ or quantities). A typical data processing system may be implemented utilizing any suitable commercially available components, such as those typically found in data computing/ communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method, comprising:
   electronically determining, by a specifically programmed communication computer system, a plurality of communications context parameters to be utilized by the specifically programmed communication computer system in allowing at least one first entity of a plurality of first entities and at least one second entity of a plurality of second entities to electronically communicate with each other;
   wherein the specifically programmed communication computer system is configured to electronically communicate with:
      1) at least one first computing device of the at least first entity and
      2) at least one second computing device of the at least one second entity;
   wherein the at least one first computing device is associated with at least one first real telephone number and the at least one second computing device is associated with at least one second real telephone number;
   wherein the computer-implemented method prevents:
      1) a first caller identification feature of the at least one first computing device from displaying the at least one second real telephone number associated with the at least one second computing device utilized by the at least one second entity; and
      2) a second caller identification feature of the at least one second computing device from displaying the at least one first real telephone number associated with the at least one first computing device utilized by the at least one first entity;
   electronically determining, by the specifically programmed communication computer system, based at least in part on the communication context data, a plurality of communications context parameters to be utilized by the specifically programmed communication computer system for allowing the at least one first entity and the at least one second entity to electronically communicate with each other,
   wherein the plurality of communications context parameters comprise:
      i) at least one first communications context parameter identifying the at least one first entity,
      ii) at least one second communications context parameter identifying the at least one first real telephone number associated with the at least one first computing device of the at least one first entity,
      iii) at least one third communications context parameter identifying the at least one second entity,
      iv) at least one fourth communications context parameter identifying the at least one second real telephone number associated with the at least one second computing device of the at least one second entity, and
      v) at least one fifth communications context parameter identifying at least one first location of at least one future meeting between the at least one first entity and the at least one second entity;
   automatically associating, by the specifically programmed communication computer system, at least one fictitious telephone number as at least one sixth communications context parameter to be utilized by the specifically programmed communication computer system for allowing the at least one first entity and the at least one second entity to electronically communicate with each other so that any electronic communication between the at least one first entity and the at least one second entity is directed to the at least one fictitious telephone number;
electronically storing, by the specifically programmed communication computer system, the at least one first through the at least one sixth communications context parameters in at least one dedicated database, residing at least partially in a non-transitory computer memory; and
performing, by the specifically programmed communication computer system, at least one of:
1) electronically and automatically transmitting, via the at least one computer network, at least one first electronic communication from the at least one first computing device utilized by the at least one first entity to the at least one second computing device utilized by the at least one second entity, by:
   i) receiving, via the at least one computer network, the at least one first electronic communication directed to the at least one fictitious telephone number, and
   ii) determining the at least one second real telephone number associated with the at least one second computing device utilized by the at least one second entity, and
   iii) transmitting, via the at least one computer network, the at least one first electronic communication to the at least one second computing device utilized by the at least one second entity; and
2) electronically and automatically transmitting, via the at least one computer network, at least one second electronic communication from the at least one second computing device utilized by the at least one second entity to the at least one first computing device utilized by the at least one first entity, by:
   i) receiving, via the at least one computer network, the at least one second electronic communication directed to the at least one fictitious telephone number, and
   ii) determining the at least one first real telephone number associated with the at least one first computing device utilized by the at least one first entity, and
   iii) transmitting, via the at least one computer network, the at least one second electronic communication to the at least one first computing device utilized by the at least one first entity.

2. The method of claim 1, wherein the method, further comprising:
automatically generating, by the specifically programmed communication computer system, the at least one fictitious telephone number.

3. The method of claim 1, wherein the method, further comprising:
electronically causing, via the at least one computer network, by the specifically programmed communication computer system, to display, utilizing at least one graphical user interface, at least:
i) the at least one first location of the at least one future meeting and
ii) the at least one fictitious telephone number.

4. The method of claim 1, wherein the method, further comprising:
electronically and continuously obtaining, via the at least one computer network, by the specifically programmed communication management computer, current location data of the at least one first computing device.

5. The method of claim 4, wherein the method, further comprising:
automatically determining, by the specifically programmed communication management computer, at least one current location of the at least one first computing device of the at least one first entity of the plurality of first entities, based, at least in part, on the current location data; and
automatically determining, by the specifically programmed communication management computer, at least one second location of the at least one future meeting, based, at least in part, on:
1) the at least one current location of the at least one first computing device of the at least one first entity of the plurality of first entities and on the location data, and
2) the at least one first location of the at least one future meeting; and
automatically causing, via the at least one computer network, by the specifically programmed communication management computer, to display the at least one second location of the at least one future meeting at:
1) the at least one first computing device utilized by the at least one first entity,
2) the at least one second computing device utilized by the at least one second entity, or
3) both.

6. The method of claim 1, wherein the method, further comprising:
electronically and continuously obtaining, via the at least one computer network, by the specifically programmed communication management computer, current location data of the at least one second computing device.

7. The method of claim 6, wherein the method, further comprising:
automatically determining, by the specifically programmed communication management computer, at least one current location of the at least one second computing device of the at least one second entity of the plurality of second entities, based, at least in part, on the current location data; and
automatically determining, by the specifically programmed communication management computer, at least one second location of the at least one future meeting, based, at least in part, on:
1) the at least one current location of the at least one second computing device of the at least one second entity of the plurality of second entities and on the location data, and
2) the at least one first location of the at least one future meeting; and
automatically causing, via the at least one computer network, by the specifically programmed communication management computer, to display the at least one second location of the at least one future meeting at:
1) the at least one first computing device utilized by the at least one first entity,
2) the at least one second computing device utilized by the at least one second entity, or
3) both.

8. The method of claim 1, wherein the method, further comprising:
electronically and continuously obtaining, via the at least one computer network, by the specifically programmed communication management computer, first current location data of the at least one first computing device; and
electronically and continuously obtaining, via the at least one computer network, by the specifically programmed communication management computer, second current location data of the at least one second computing device.

9. The method of claim 8, wherein the method, further comprising:
automatically determining, by the specifically programmed communication management computer, at least one first current location of the at least one first computing device of the at least one first entity of the plurality of first entities, based, at least in part, on the current location data; and
automatically determining, by the specifically programmed communication management computer, at least one second current location of the at least one second computing device of the at least one second entity of the plurality of second entities, based, at least in part, on the current location data; and
automatically determining, by the specifically programmed communication management computer, at least one second location of the at least one future meeting, based, at least in part, on:
1) the at least one first current location of the at least one first computing device of the at least one first entity of the plurality of first entities and on the location data,
2) at least one second current location of the at least one second computing device of the at least one second entity of the plurality of second entities, and
3) the at least one first location of the at least one future meeting; and
automatically causing, via the at least one computer network, by the specifically programmed communication management computer, to display the at least one second location of the at least one future meeting at:
1) the at least one first computing device utilized by the at least one first entity,
2) the at least one second computing device utilized by the at least one second entity, or
3) both.

10. The method of claim 1, wherein the at least one first entity and the at least one second entity are individuals.

11. The method of claim 1, wherein the at least one fictitious telephone number is a random number or a pseudorandom number.

12. The method of claim 1, wherein the at least one first entity is a group of first entities.

13. The method of claim 1, wherein the at least one second entity is a group of second entities.

14. The method of claim 1, wherein the at least one first entity is a group of first entities; and wherein the at least one second entity is a group of second entities.

15. A specifically programmed communication computer system, comprising:
at least one specialized communication computer machine, comprising:
a non-transient memory having at least one region for storing particular computer executable program code; and
at least one processor for executing the particular program code stored in the memory, wherein the particular program code is configured to at least perform the following operations upon the execution:
electronically determining, by the specifically programmed communication computer system, a plurality of communications context parameters to be utilized by the specifically programmed communication computer system in allowing at least one first entity of a plurality of first entities and at least one second entity of a plurality of second entities to electronically communicate with each other;
wherein the specifically programmed communication computer system is configured to electronically communicate with:
1) at least one first computing device of the at least first entity and
2) at least one second computing device of the at least one second entity;
wherein the at least one first computing device is associated with at least one first real telephone number and the at least one second computing device is associated with at least one second real telephone number;
wherein the computer-implemented method prevents:
1) a first caller identification feature of the at least one first computing device from displaying the at least one second real telephone number associated with the at least one second computing device utilized by the at least one second entity; and
2) a second caller identification feature of the at least one second computing device from displaying the at least one first real telephone number associated with the at least one first computing device utilized by the at least one first entity;
electronically determining, by the specifically programmed communication computer system, based at least in part on the communication context data, a plurality of communications context parameters to be utilized by the specifically programmed communication computer system for allowing the at least one first entity and the at least one second entity to electronically communicate with each other,
wherein the plurality of communications context parameters comprise:
i) at least one first communications context parameter identifying the at least one first entity,
ii) at least one second communications context parameter identifying the at least one first real telephone number associated with the at least one first computing device of the at least one first entity,
iii) at least one third communications context parameter identifying the at least one second entity,
iv) at least one fourth communications context parameter identifying the at least one second real telephone number associated with the at least one second computing device of the at least one second entity, and
v) at least one fifth communications context parameter identifying at least one first location of at least one future meeting between the at least one first entity and the at least one second entity;
automatically associating, by the specifically programmed communication computer system, at least one fictitious telephone number as at least one sixth communications context parameter to be utilized by the specifically programmed communication computer system for allowing the at least one first entity and the at least one second entity to electronically communicate with each other so that any electronic communication between the at least one first entity and the at least one second entity is directed to the at least one fictitious telephone number;
electronically storing, by the specifically programmed communication computer system, the at least one first through the at least one sixth communications context parameters in at least one dedicated database, residing at least partially in a non-transitory computer memory; and performing, by the specifically programmed communication computer system, at least one of:
1) electronically and automatically transmitting, via the at least one computer network, at least one first electronic communication from the at least one first computing device utilized by the at least one first entity to the at least one second computing device utilized by the at least one second entity, by:
   i) receiving, via the at least one computer network, the at least one first electronic communication directed to the at least one fictitious telephone number, and
   ii) determining the at least one second real telephone number associated with the at least one second computing device utilized by the at least one second entity, and
   iii) transmitting, via the at least one computer network, the at least one first electronic communication to the at least one second computing device utilized by the at least one second entity; and
2) electronically and automatically transmitting, via the at least one computer network, at least one second electronic communication from the at least one second computing device utilized by the at least one second entity to the at least one first computing device utilized by the at least one first entity, by:
   i) receiving, via the at least one computer network, the at least one second electronic communication directed to the at least one fictitious telephone number, and
   ii) determining the at least one first real telephone number associated with the at least one first computing device utilized by the at least one first entity, and
   iii) transmitting, via the at least one computer network, the at least one second electronic communication to the at least one first computing device utilized by the at least one first entity.

16. The system of claim 15, wherein the particular program code is configured to further perform the following operations upon the execution:
automatically generating, by the specifically programmed communication computer system, the at least one fictitious telephone number.

17. The system of claim 15, wherein the particular program code is configured to further perform the following operations upon the execution:
electronically causing, via the at least one computer network, by the specifically programmed communication computer system, to display, utilizing at least one graphical user interface, at least:
   i) the at least one first location of the at least one future meeting and
   ii) the at least one fictitious telephone number.

18. The system of claim 15, wherein the particular program code is configured to further perform the following operations upon the execution:
electronically and continuously obtaining, via the at least one computer network, by the specifically programmed communication management computer, current location data of the at least one first computing device.

19. The system of claim 18, wherein the particular program code is configured to further perform the following operations upon the execution:
automatically determining, by the specifically programmed communication management computer, at least one current location of the at least one first computing device of the at least one first entity of the plurality of first entities, based, at least in part, on the current location data; and
automatically determining, by the specifically programmed communication management computer, at least one second location of the at least one future meeting, based, at least in part, on:
   1) the at least one current location of the at least one first computing device of the at least one first entity of the plurality of first entities and on the location data, and
   2) the at least one first location of the at least one future meeting; and
automatically causing, via the at least one computer network, by the specifically programmed communication management computer, to display the at least one second location of the at least one future meeting at:
   1) the at least one first computing device utilized by the at least one first entity,
   2) the at least one second computing device utilized by the at least one second entity, or
   3) both.

20. The system of claim 15, wherein the particular program code is configured to further perform the following operations upon the execution:
electronically and continuously obtaining, via the at least one computer network, by the specifically programmed communication management computer, current location data of the at least one second computing device.

21. The system of claim 20, wherein the particular program code is configured to further perform the following operations upon the execution:
automatically determining, by the specifically programmed communication management computer, at least one current location of the at least one second computing device of the at least one second entity of the plurality of second entities, based, at least in part, on the current location data; and
automatically determining, by the specifically programmed communication management computer, at least one second location of the at least one future meeting, based, at least in part, on:
   1) the at least one current location of the at least one second computing device of the at least one second entity of the plurality of second entities and on the location data, and
   2) the at least one first location of the at least one future meeting; and
automatically causing, via the at least one computer network, by the specifically programmed communication management computer, to display the at least one second location of the at least one future meeting at:
   1) the at least one first computing device utilized by the at least one first entity,
   2) the at least one second computing device utilized by the at least one second entity, or
   3) both.

22. The system of claim 15, wherein the particular program code is configured to further perform the following operations upon the execution:
electronically and continuously obtaining, via the at least one computer network, by the specifically programmed communication management computer, first current location data of the at least one first computing device; and
electronically and continuously obtaining, via the at least one computer network, by the specifically programmed communication management computer, second current location data of the at least one second computing device.

23. The system of claim 22, wherein the particular program code is configured to further perform the following operations upon the execution:
automatically determining, by the specifically programmed communication management computer, at least one first current location of the at least one first computing device of the at least one first entity of the plurality of first entities, based, at least in part, on the current location data; and
automatically determining, by the specifically programmed communication management computer, at least one second current location of the at least one second computing device of the at least one second entity of the plurality of second entities, based, at least in part, on the current location data; and
automatically determining, by the specifically programmed communication management computer, at least one second location of the at least one future meeting, based, at least in part, on:
1) the at least one first current location of the at least one first computing device of the at least one first entity of the plurality of first entities and on the location data,
2) at least one second current location of the at least one second computing device of the at least one second entity of the plurality of second entities, and
3) the at least one first location of the at least one future meeting; and
automatically causing, via the at least one computer network, by the specifically programmed communication management computer, to display the at least one second location of the at least one future meeting at:
1) the at least one first computing device utilized by the at least one first entity,
2) the at least one second computing device utilized by the at least one second entity, or
3) both.

24. The system of claim 15, wherein the at least one first entity and the at least one second entity are individuals.

25. The system of claim 15, wherein the at least one fictitious telephone number is a random number or a pseudo-random number.

26. The system of claim 15, wherein the at least one first entity is a group of first entities.

27. The system of claim 15, wherein the at least one second entity is a group of second entities.

28. The system of claim 15, wherein the at least one first entity is a group of first entities; and wherein the at least one second entity is a group of second entities.

* * * * *

UNITED STATES PATENT AND TRADEMARK OFFICE
CERTIFICATE OF CORRECTION

PATENT NO. : 9,152,928 B2  
APPLICATION NO. : 11/645219  
DATED : October 6, 2015  
INVENTOR(S) : Alexander J. Cohen et al.

Page 1 of 1

It is certified that error appears in the above-identified patent and that said Letters Patent is hereby corrected as shown below:

In the Claims  
Column 26, Line 8, Delete "a plurality of".  
Column 26, Lines 8-9, Delete "s" in "communications".  
Column 26, Line 9, Delete "parameters"; and Insert --data-- after "context".  
Column 29, Line 64, Delete "a plurality".  
Column 29, Line 65, Delete "of" before "communications"; Delete "s" in "communications"; Delete "parameters"; and Insert --data-- after "context".

Signed and Sealed this  
Twenty-second Day of December, 2015

Michelle K. Lee  
*Director of the United States Patent and Trademark Office*